INVENTOR.
WILLIAM W. PHARIS
BY T. L. Bowes
ATTORNEY

TRUNK CIRCUIT 27

INVENTOR.
WILLIAM W. PHARIS
BY
T. L. Bowes
ATTORNEY

Oct. 5, 1954 W. W. PHARIS 2,691,068

TWO-WAY CARRIER TYPE TRUNK CIRCUIT

Filed Dec. 11, 1950 20 Sheets-Sheet 3

TRUNK CIRCUIT 27

INVENTOR.
WILLIAM W. PHARIS
BY
T. L. Bowes
ATTORNEY

TWO-WAY CARRIER TYPE TRUNK CIRCUIT

Filed Dec. 11, 1950 20 Sheets-Sheet 4

INVENTOR.
WILLIAM W. PHARIS
BY
T. L. Bowes
ATTORNEY

INVENTOR.
WILLIAM W. PHARIS
BY T. L. Bowes
ATTORNEY

Oct. 5, 1954 W. W. PHARIS 2,691,068

TWO-WAY CARRIER TYPE TRUNK CIRCUIT

Filed Dec. 11, 1950 20 Sheets-Sheet 6

INVENTOR.
WILLIAM W. PHARIS
BY
T. L. Bowes
ATTORNEY

INVENTOR.
WILLIAM W. PHARIS
BY T. L. Bowes
ATTORNEY

Oct. 5, 1954 W. W. PHARIS 2,691,068

TWO-WAY CARRIER TYPE TRUNK CIRCUIT

Filed Dec. 11, 1950 20 Sheets-Sheet 8

INVENTOR.
WILLIAM W. PHARIS
BY T. L. Bowes
ATTORNEY

CARRIER TERMINAL 21'

INVENTOR.
WILLIAM W. PHARIS
BY
T. L. Bowes
ATTORNEY

TRUNK CIRCUIT 23

INVENTOR.
WILLIAM W. PHARIS
BY T. L. Bowes
ATTORNEY

INVENTOR.
WILLIAM W. PHARIS
BY
T. L. Bowes
ATTORNEY

INVENTOR.
WILLIAM W. PHARIS
BY
T. L. Bowes
ATTORNEY

Oct. 5, 1954 W. W. PHARIS 2,691,068

TWO-WAY CARRIER TYPE TRUNK CIRCUIT

Filed Dec. 11, 1950 20 Sheets-Sheet 13

INVENTOR.
WILLIAM W. PHARIS
BY T. L. Bowes
ATTORNEY

INVENTOR.
WILLIAM W. PHARIS
BY T. L. Bowes
ATTORNEY

Oct. 5, 1954 W. W. PHARIS 2,691,068

TWO-WAY CARRIER TYPE TRUNK CIRCUIT

Filed Dec. 11, 1950 20 Sheets-Sheet 15

INVENTOR.
WILLIAM W. PHARIS
BY T. L. Bowes
ATTORNEY

Oct. 5, 1954 W. W. PHARIS 2,691,068

TWO-WAY CARRIER TYPE TRUNK CIRCUIT

Filed Dec. 11, 1950 20 Sheets-Sheet 16

CARRIER ADAPTER CIRCUIT 20

INVENTOR.
WILLIAM W. PHARIS
BY T. L. Bowes
ATTORNEY

Oct. 5, 1954 W. W. PHARIS 2,691,068

TWO-WAY CARRIER TYPE TRUNK CIRCUIT

Filed Dec. 11, 1950 20 Sheets-Sheet 17

CARRIER ADAPTER CIRCUIT 29

INVENTOR.
WILLIAM W. PHARIS
BY T. L. Bowes
ATTORNEY

Oct. 5, 1954 W. W. PHARIS 2,691,068

TWO-WAY CARRIER TYPE TRUNK CIRCUIT

Filed Dec. 11, 1950 20 Sheets-Sheet 18

TRUNK CIRCUIT 30

INVENTOR.
WILLIAM W. PHARIS
BY
T. L. Bowes
ATTORNEY

Oct. 5, 1954 W. W. PHARIS 2,691,068

TWO-WAY CARRIER TYPE TRUNK CIRCUIT

Filed Dec. 11, 1950 20 Sheets-Sheet 19

TRUNK CIRCUIT 30

INVENTOR.
WILLIAM W. PHARIS
BY
T. L. Bowes
ATTORNEY

INVENTOR.
WILLIAM W. PHARIS
BY T. L. Bowes
ATTORNEY

Patented Oct. 5, 1954 2,691,068

UNITED STATES PATENT OFFICE 2,691,068

TWO-WAY CARRIER TYPE TRUNK CIRCUIT

William W. Pharis, Rochester, N. Y., assignor to Stromberg-Carlson Company, a corporation of New York Application December 11, 1950, Serial No. 200,170

7 Claims. (Cl. 179—27)

This invention relates to telephone systems.

Telephone systems have been proposed in which a carrier current link is employed. In such systems, carrier terminals are provided for terminating the telephone circuits and for translating the audio signals and necessary supervisory signals for transmission over the carrier link and for restoring at the remote end of the link the audio and supervisory components to suitable form for use in remote telephone circuits. It is an object of the present invention to provide suitable carrier trunks for interconnecting such carrier terminals and conventional telephone circuits whether of the automatic or manual type.

It is another object of my invention to provide combination idle line termination and spark suppression means for use in telephone systems whether or not of the carrier type.

Still another object of my invention is to provide start-dial signal means for use in telephone systems whether or not of the carrier type.

The features of my invention which I believe to be novel are set forth with particularity in the appended claims. My invention itself, both as to its organization and manner of operation, together with further objects and advantages thereof, may best be understood by reference to the following description taken in connection with the accompanying drawing in which Fig. 1 is a block diagram disclosing a telephone system embodying the various features of my present invention, Fig. 2 is a block diagram showing the relationship of Figs. 3 to 16, inclusive, and Figs. 3 to 16, inclusive, disclose circuit details of the carrier trunks, carrier terminals and carrier adapters shown in Fig. 1.

Figures 1, 2:
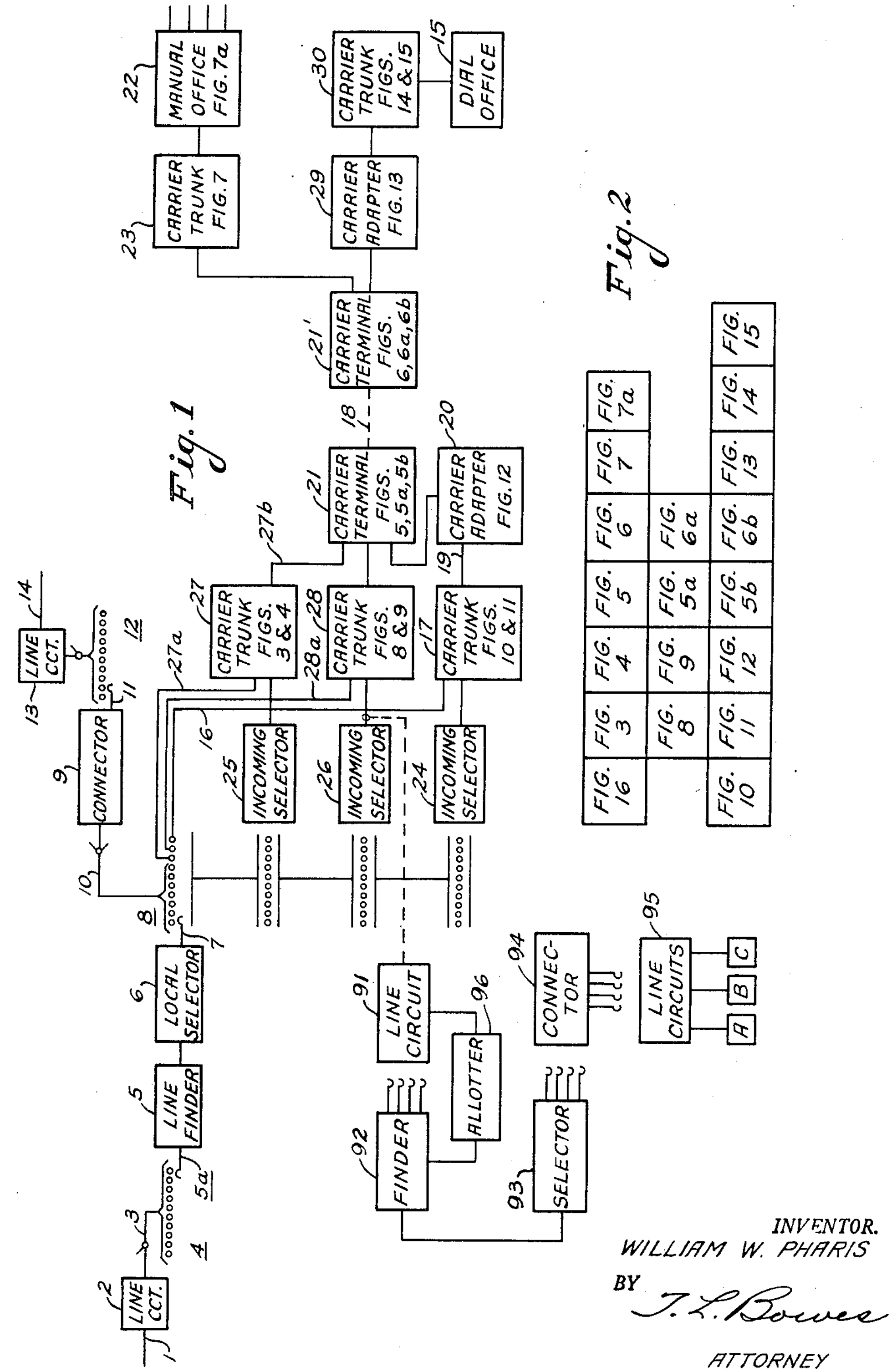

In Fig. 1, there are illustrated in block diagram form the principal components of an automatic telephone system. The blocks representing line circuits, line finders, selectors and connectors may be entirely conventional and any components known to the art may be utilized for the designated functions and purposes.

Thus, a suitable subscriber's line, indicated by the numeral 1, terminates in a suitable line circuit 2, and line circuit 2 is connected by lead 3 to a terminal in the bank 4 of line finder 5. The function of the line finder, as is well known, is to seek the position of a calling line in the finder bank 4 as by means of a suitable switch indicated in Fig. 1 by the single wiper 5*a*.

In the illustrative example of Fig. 1, line finder 5 is in turn connected to a local selector 6 which has a directively operated switch indicated by the single contact member or brush 7 and terminal bank 8. Connected into the bank terminals are a plurality of suitable connectors 9 as indicated by the lead 10. Connector 9 has associated therewith a suitable switch indicated by the single contact member or brush 11 arranged to be directively operated to the proper terminal in terminal bank 12 of the connector 9, the individual terminals being connected to suitable line circuits, such as indicated by numeral 13 and subscriber lines such as indicated by the numeral 14.

Means is provided for extending toll calls to and from subscriber's line 1. Such means comprise suitable trunk circuits and in order to accommodate a plurality of messages on a single toll line, carrier current equipment is provided to enable the desired duplexing.

Referring again to Fig. 1, there is shown in block form the necessary component circuits to enable the carrying out of the foregoing functions. Means is provided for extending a toll call from, for example, line 1 to dial office 15. The extension of such a call to dial office 15 may be accomplished by connecting a suitable trunk circuit into a suitable terminal in bank 8 of local selector 6. For example, the tenth contact of terminal bank 8 is shown connected by means of conductor group 16 to a suitable trunk circuit 17 which in turn is connected to toll line 18 or other suitable carrier medium through conductor group 19, a carrier adapter circuit 20 and a suitable carrier current terminal 21. The remote end of toll line 18 is terminated by a suitable carrier terminal 21' and the outgoing side of the carrier terminal 21' is shown connected to dial office 15 through a carrier adapter circuit 29 and carrier trunk 30. Toll line 18 may be a metallic line or a radio link or any other suitable connection.

The carrier trunk 17 is arranged to receive calls incoming over toll line 18 and through carrier terminal 21 and to forward the incoming call to incoming selector 24. The banks of the incoming selector 24 are multiplied with the banks of the other incoming selectors 25 and 26 and local selector 6 as indicated in Fig. 1.

The foregoing system is designed to service dial-to-dial calls. Trunk circuits are also provided for handling calls between a dial office and a manual office. There are illustrated two dial-to-manual carrier trunks containing different embodiments of my invention and indicated, respectively, by the numerals 27 and 28. Dial-to-manual carrier trunk circuits 27 and 28 are connected to the eighth and ninth contacts, respectively, in terminal bank 8 for outgoing messages and are connected to incoming selectors 25 and 26, respectively, for incoming calls. The outgoing terminals of carrier trunks 27 and 28, respectively, are connected into carrier terminal 21 for transmission on separate carrier channels. The remote carrier terminal 21′ is shown connected to manual office 22 through a suitable carrier trunk circuit 23.

There follows a step-by-step description of calls extended on a dial-to-manual basis through carrier trunks 27 and 28, designated as "first circuit" and "second circuit," respectively, as well as a detailed description of a dial-to-dial call through carrier trunk 17.

DIAL-TO-MANUAL

*First circuit*

Figure 3:
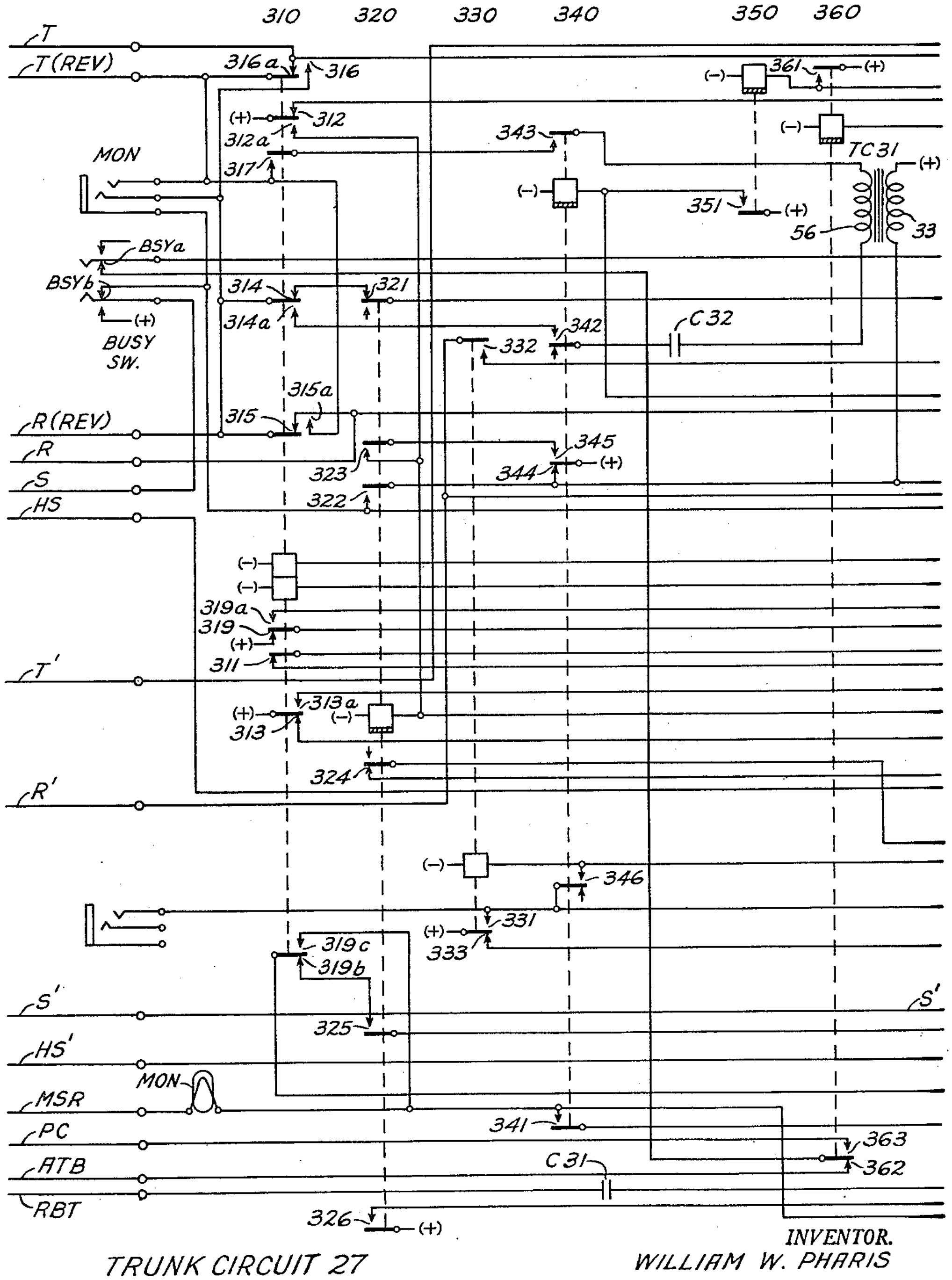
Figure 4:
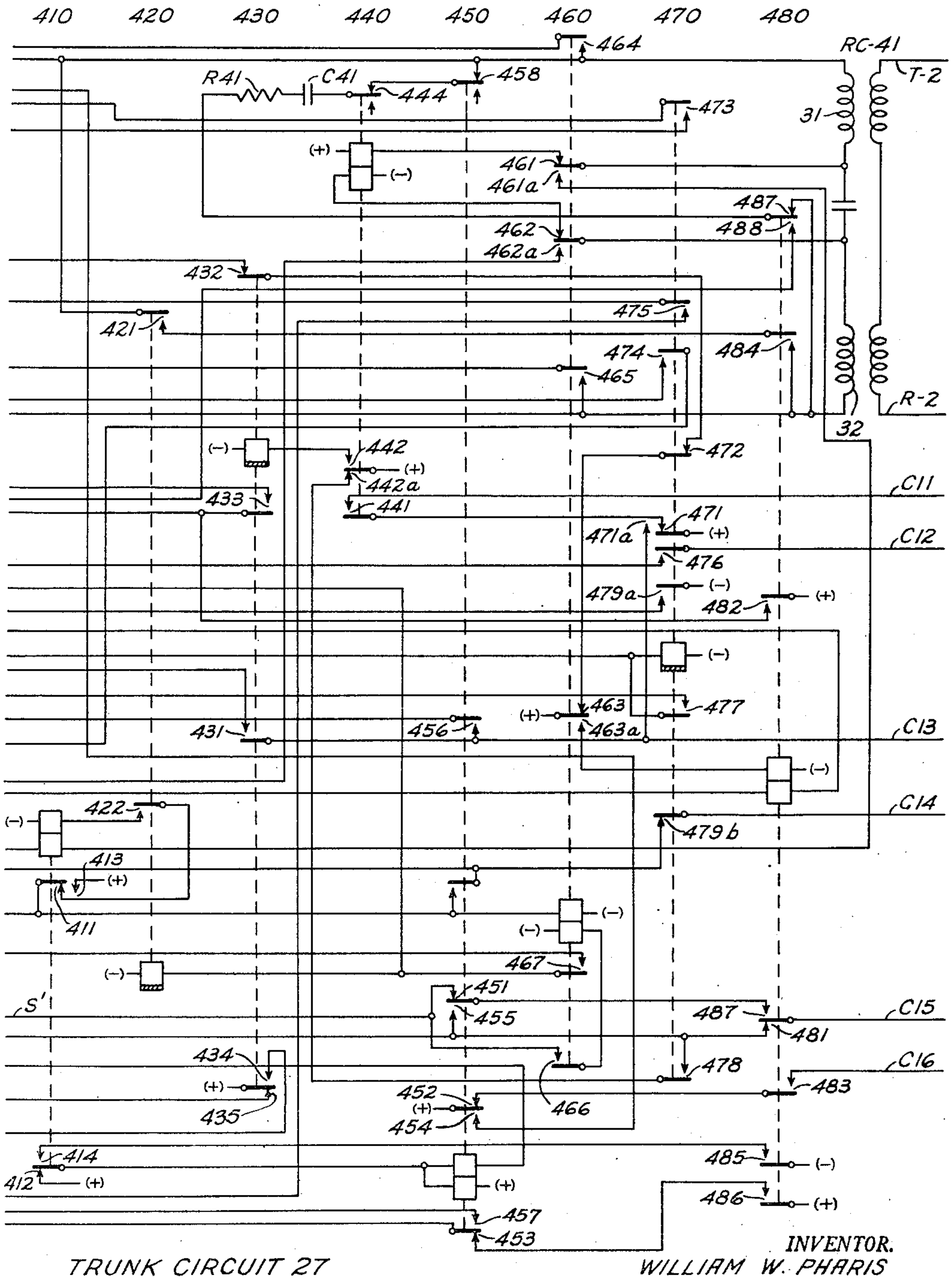
Figure 5:
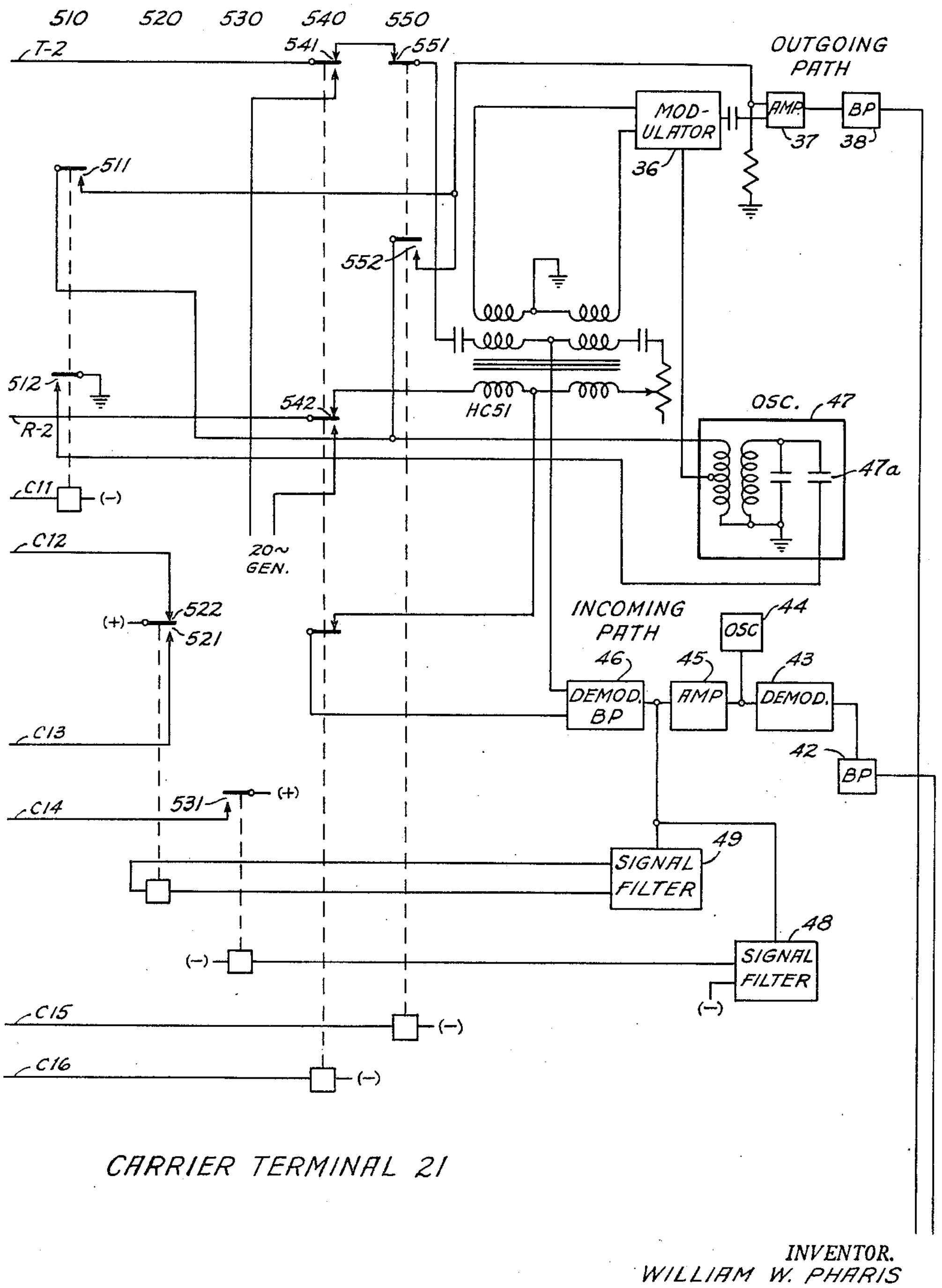
Figure 6:
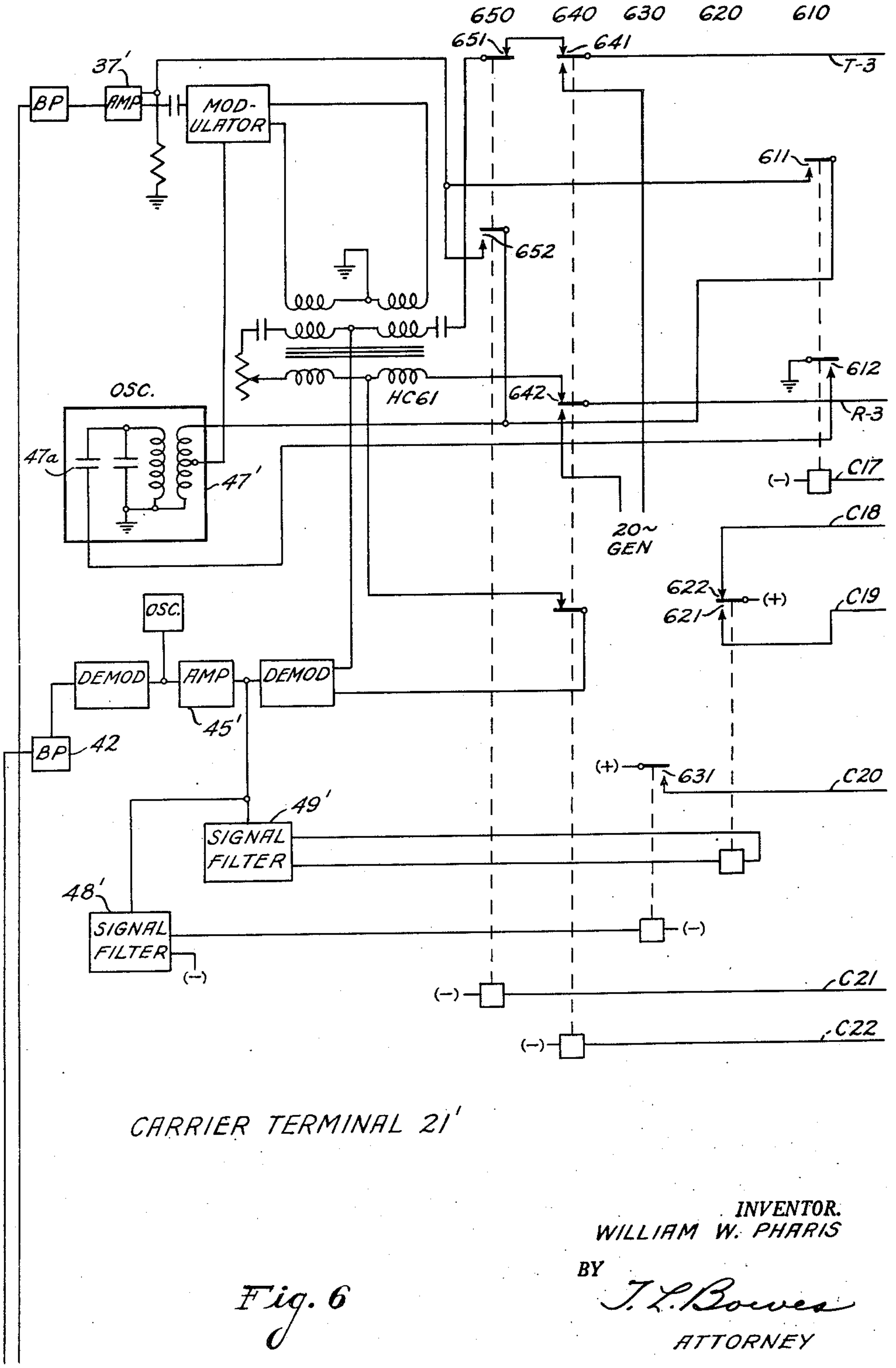

*Outgoing call.*—Reference is made particularly to Figures 3, 4, 5, 6, 7 and 7*a*. Figs. 5 and 6 disclose suitable local and remote carrier terminals, respectively, and Figs. 3, 4, 7 and 7*a* disclose specific embodiments of dial-to-manual carrier trunk circuits.

The carrier trunk shown in Figs. 3 and 4 is arranged to provide the following principal functions in conjunction with carrier current equipment: to forward dial pulses and supervisory signals, to provide ringback tone when required to provide coin box tone when paystations are included, to give operator supervision, to enable CLR holding, and to provide for recall in either direction.

As previously indicated, the eighth contact in terminal bank 8 of local selector 6 is connected to the carrier trunk 27, illustrated in Figs. (3 and 4) by means of cable 27*a*. The cable or conductor group 27*a* includes the tip lead T, ring lead R, sleeve lead S, and control lead HS as indicated in Fig. 3. When the local selector 6 halts on the terminals connected to conductor group 27*a*, the tip and ring leads T and R, respectively, are extended to trunk circuit 27 in a conventional manner and the trunk circuit is seized, thereby completing a loop circuit to operate calling bridge relay 440. The circuit extends from the tip lead T through the winding 31 of repeat coil RC–41, normally closed contacts 461 of relay 460 and the upper winding of relay 440 to ground. (It is to be noted that, for the purposes of this specification, the positive terminal of battery is considered to be grounded so that connections to "ground" may also be understood to be connections to the positive terminal of the direct current potential source. Similarly, the expression "battery" is used herein to designate the negative terminal of the source of potential.) The lower winding of relay 440 is connected to battery at one terminal and the other terminal thereof extends to ring lead R through normally closed contacts 462 of relay 460 and repeat coil winding 32.

Operation of relay 440 energizes relay 510 in the local carrier terminal 21, shown in Fig. 5, over a circuit extending from battery at one terminal of the winding of relay 510 to ground through conductor C11, normally open contacts 441 and normally closed contacts 471 of relay 470; energizes the first delay relay 430 over a circuit extending from battery through the winding of relay 430 to ground at the operated contacts 442; and opens the idle termination comprising a suitable resistance R41 and a suitable capacitance C41 at break contacts 444 in order not to shunt repeat coil RC41.

The all-trunk-busy lead ATB is connected to ground in the unseized condition of the trunk over a circuit which includes normally closed contacts 362, normally closed contacts BSY*a* of the busy key, normally closed contacts 432, normally closed contacts 472 and normally closed contacts 463. The operation of relay 430 removes ground from the all-trunks-busy lead ATB at normally closed contacts 432. Relay 430, upon operating, also places ground on the back sleeve lead S to hold the preceding equipment and to mark this circuit as busy; the circuit extending from lead S through normally closed contacts BSY*b*, operated contacts 433 and winding 33 of the tone coil TC31 to ground.

It was previously mentioned that relay 510 is energized in response to the operation of calling bridge relay 440. Operation of relay 510 in the local carrier terminal 21 is utilized to operate relay 630 at the distant carrier terminal 21′ to seize the distant trunk 23.

Carrier terminals 21 and 21′ may be identical, as illustrated. Generally speaking, each comprises an outgoing path and an incoming path. The outgoing voice currents enter the terminal equipment from the tip and ring leads T–2 and R–2, respectively, and are connected through normally closed contacts 541 and 542, respectively, to the hybrid coil HC51. In series with contact 541, there is shown a normally closed contact 551 of relay 550. After passing through the hybrid coil HC51, the outgoing signals are connected to the outgoing toll trunk 18 through a suitable modulator 36, amplifier 37 of the electron tube type, band pass filter 38, high pass filter 39 (see Fig. 5*a*) and high pass filter 40. Inasmuch as all components of the carrier terminal 21 shown in block form may be conventional and the details thereof form no part of my present invention, the detailed circuits are not illustrated. The modulator band pass filter is employed to suppress all of the undesired frequencies and to allow only the desired side band to pass through to the high pass filter 39.

Incoming signals, after passing through the line filter 40 and low pass filter 41, are selected by the proper directional band pass filter 42 (see Fig. 5) corresponding to the selected carrier channel and impressed on the input side of a suitable demodulator 43. The demodulator oscillator 44 is provided to re-supply the carrier frequency. The incoming signals are combined with the carrier frequency and all frequencies resulting from the process of demodulation comprising the sum and difference frequencies, as well as the voice frequency signals, are amplified by the receiving amplifier 45. The amplified signals are impressed upon the demodulator band pass filter 46 which functions to pass only the desired band of voice frequencies and attenuates all the undesired modulated frequencies. The remaining voice frequencies are connected to the tip and ring leads, T–2 and R–2, through the hybrid transformer HC51.

As previously mentioned, upon the seizure of the carrier terminal equipment, relay 510 is operated. Operation of relay 510 is utilized to apply the output of oscillator 47 to amplifier 37 through operated contacts 511 of relay 510 in order to render operative amplifier 37 and to change the frequency of the modulator oscillator 47, as by connecting capacitor 47*a* (Fig. 5) to ground through make contacts 512 in order to change the L–C product of oscillator 47 and thereby change the oscillator frequency as may be desired. The resulting signal is transmitted to the remote carrier terminal 21′ illustrated in Fig. 6. The narrow band filter 42′ at the remote terminal allows only the difference frequency to pass and after amplification in amplifier 45′ the remaining signal is applied to the input sides of signal filters 48′ and 49′. The filters are so arranged that filter 48′ passes a supervisory signal of frequency assigned to incoming calls and filter 49′ passes supervisory signals of frequency designating outgoing calls (i. e., calls originating at the dial substation and extending to manual office 24). It should be noted that the position of relay 550 always affects the energization of relay 620; that of relay 510 always controls the energization of relay 630; that of relay 650 always controls the energization of relay 520; and that of relay 610 affects the energization of relay 530. In the present example, therefore, a supervisory signal is passed through signal filter 48′ to operate relay 630.

The operation of relay 630 results in the seizure of carrier trunk circuit 23. In response to the operation of relay 630, relay 710 is energized over a circuit extending from battery, through the lower winding of relay 710, conductor C20 and operated contacts 631 to ground. Operation of relay 710 completes circuits through make contacts 711 and 712, respectively, for lighting busy lamp L1 and incoming signal lamp L2 (Fig. 7*a*); operation of relay 710 also causes energization of relay 650 over a circuit extending from battery through the winding or coil of relay 650, conductor C21, make contacts 713 and normally closed or back contacts 761 to ground, and energization of relay 640 over a circuit extending from battery through the coil of relay 640, conductor C22, make contacts 714 and normally closed contacts 762 to ground.

Relay 650, upon operating, applies, through contacts 652, the output of oscillator 47′ to the input to amplifier 37′, as explained in connection with Fig. 5, and opens, at contacts 651, the incoming circuit to hybrid coil HC61.

Relay 640, upon operating, also interrupts lead T–3 to hybrid coil HC61 at contacts 641 and 642.

Upon the operation of relay 650 in the distant carrier terminal 21′, a control or supervisory frequency is returned to carrier terminal 21 responsive to the closure of contacts 611 to operate relay 520 through signal filter 49 in the same manner as described above in connection with relay 510 and oscillator 37 in carrier terminal 21.

Upon the operation of relay 520 in the local carrier terminal 21, supervisory relay 470 is operated. From battery, the circuit extends through the winding of relay 470, normally closed contacts 311, operated contacts 431, conductor C13, and operated contacts 521 to ground.

The operation of relay 470 results in the energization of coin tone relay 360, the energizing circuit extending from battery through the winding of relay 360, operated contacts 473 and normally closed contacts 312 to ground. Relay 350 operates following the energization of relay 360 over an obvious circuit including contacts 361.

The operation of relay 470 also completes a circuit for energizing relay 340 over a circuit extending to ground from the winding of relay 340 through operated contacts 474 and normally closed contacts 313 and transfers a holding circuit for relay 510 from ground at break contacts 471 to ground through make contacts 471*a*, conductor C13 and make contacts 521.

Ring back tone is applied to the ring side of the calling line from the RBT lead through capacitor C31, operated contacts 475 and normally closed contacts 321, 314 and 315. Provision is made for illuminating a lamp MON if the customary key provided in the supervisory circuit is thrown in the proper direction, the circuit extending from the MSR lead through lamp MON, operated contacts 341 and 434 to ground.

Referring back to the operation of relay 710, it was stated that lamp L2 was lighted. Upon the lighting of the incoming lamp L2 in the manual office 24 (Fig. 7*a*), the operator at the manual office 24 is apprised of the presence of a call and answers the call by plugging into line jack J1 a suitable cord circuit which results in the energization of relay 760 over an obvious circuit. Operation of relay 760 locks in the circuit for the busy lamp L1 through make contacts 764; releases relay 650 by opening its operating circuit at break contact 761; releases relay 640 by opening its energization circuit at contacts 762; and energizes relay 720 over a circuit extending from battery through the lower winding or coil of relay 720, make contacts 763, conductor C18, and break contacts 622 to ground. At this point attention is called to the provision of an idle line termination comprising a suitable capacitance C71 and a suitable resistance R71 connected in series across leads T–4 and R–4, i. e., across the outgoing side of repeat coil RC71. The output of amplifier or repeater 45 appears across repeat coil RC71. Unless the output side of amplifier 45 is properly balanced or terminated, "singing" or feedback may occur on leads T and R extending back to the calling station. To properly balance the extended line, the idle termination is provided. When the operator plugs in to jack J1, the required balance is provided at manual office 24 and the idle termination is no longer needed and is opened at break contact 767 upon the operation of relay 760, thereby eliminating any shunting effect across leads T–4 and R–4. The operation of relay 720 completes through contacts 721 a shunt across capacitor C72 to provide a direct current path between T–4 and R–4 through the upper winding of relay 720 to enable supervision; energizes relay 740 over a circuit extending from battery through the coil of relay 740, make contacts 715 and make contacts 765 to ground, thereby energizing relay 730 at transfer contacts 742. Operation of relay 730 extinguishes lamp L2 at contacts 733; completes a third path from battery to lamp L1 at contacts 732; completes a second energizing path for relay 740 by way of operated contacts 735 and 717; and completes a locking path for relay 710 over a circuit extending from battery through the upper winding of relay 710 and operated contacts 719 and 737 to ground at break contacts 622.

Responsive to the release of relay 650, relay 520 at the local carrier terminal 21 releases because of the removal of the signal utilized to energize relay 520. Release of relay 520 in the local or outgoing carrier terminal 21 causes the operation of relay 310 over a circuit extending from battery through the upper winding or coil of relay 310, operated contacts 476, conductor C12, and break contacts 522 to ground. Operation of relay 310 completes a locking circuit for previously operated relay 470 over a circuit extending from the coil of relay 470 through make contacts 477 and make contacts 313*a* to ground; and removes ring-back tone from lead R at break contacts 314.

The de-energization of relay 520 also causes the release of relay 510 by opening contacts 521 in the holding circuit for relay 510. As a result of the release of relay 510, there follows the release of relay 630 at the distant carrier terminal 21′ because of the removal of the signal control voltage at the output terminals of filter 48′.

If the calling station is connected to tip lead T(REV) and ring lead R(REV), reverse battery supervision is given in response to the operation of relay 310 by the opening of break contacts 316a and 315, respectively, and the closure of transfer contacts 316 and 315a, respectively. However, a station connected to the tip and ring leads T and R, respectively, does not receive reverse battery supervision.

Operation of relay 310 opens the energizing circuit for relay 360 at break contacts 312 and relay 360 releases. In turn, relay 350 releases because of the opening of contacts 361. Relay 340 releases in response to the release of relay 350.

Means is provided for extending coin box tone, if provided, to the operator at manual office 22 at the time relay 310 operates following answering by the operator. Thus, if a calling paystation is connected to the tip leads T and R, respectively, the coin box tone circuit extends from lead T through operated contacts 316, 314a and 342, capacitor C32, secondary winding 56 of the tone coil TC31, operated contacts 343, 317 and 315a to ring lead R. If the calling station is brought in on the tip and ring leads T(REV) and R(REV), respectively, the tone circuit extends from tip lead T(REV) through operated contacts 317, 343, winding 56 of tone coil TC31, condenser C32, and make contacts 342 and 314a to ring lead R(REV).

If coin box tone is provided, as stated above, the tone is applied by way of contacts 342 and 343. Further, as stated above, in response to answering by the operator, relay 760, 740, 730 and 310 operate in order, and relays 360, 350 and 340 release in order in response to the operation of relay 310. Accordingly, coin box tone continues only during the release times of slow-to-release relays 360, 350 and 340.

The operation of relay 310 is also employed to substitute resistance battery on the back HS lead for the previously applied resistance ground applied thereto. Thus, the resistance of the lower winding of relay 480 is transferred from ground at break contacts 319 of relay 310 to battery by way of make contacts 319a and make contacts 479a.

The operation of relay 310 is also used to operate relay 320 over a circuit extending from battery through the winding of relay 320 to ground on operated contacts 312a of relay 310.

The operation of relay 320 results in the removal of ring back tone from the calling line at break contacts 321.

The operator may re-check for coin box tone by momentarily withdrawing plug P1 and thereby releasing relay 760 to reoperate relay 520 of the local carrier terminal 21, thereby releasing relay 310 and reoperating relays 360, 350 and 340. When relay 520 of the local carrier terminal is released following reinsertion of plug P1, relay 310 reoperates and coin box tone is applied to the extended calling line for the release time of relays 340, 350 and 360, each of which is of a slow release type. Ring back tone, however, is not reapplied to the line because relay 320 remains operated due to its slow release characteristic.

The conversation path is now complete. Note that all relays in the carrier terminals are deenergized or released during the conversation period.

The sequence of events following release by the calling party is next described. When the calling party releases, the conversation loop is broken to release the calling bridge relay 440 which thereby releases delay relay 430 at make contacts 442 and restores the idle termination at contacts 444. The release of relay 430 lights lamp MON by way of contacts 319c and 435. The extended connection is held, however, because the back sleeve lead S is still grounded over a circuit extending from lead S through the busy switch and operated contacts 322 to ground on normally closed or back contacts 344.

The release of relay 440 also effects the energization of relay 550 in the local carrier terminal 21 over a circuit extending from battery through the winding of relay 550, conductor C15, normally closed contacts 481 and operated contacts 478, to ground on back contacts 442a. Operation of relay 550 at this time causes the energization of relay 620 in the distant carrier terminal 21', by transmitting a different carrier frequency than previously. It will be recalled that in extending the call, relay 510 caused insertion of capacitor 47a in the L-C circuit of oscillator 47. The operation of relay 550, however, does not add the capacity of capacitor 47a and the frequency applied to the carrier medium 18 is of such value as to pass filter 49' and to operate relay 620. Disconnect supervision to the operator at the manual office is thereby provided because the reoperation of relay 620 de-energizes relay 720 to open the loop to the operator over leads T-4 and R-4 at contacts 721, thereby establishing a suitable signal for the operator. For example, opening of the loop may be used to release a battery feed relay 720a to complete a circuit for illuminating lamp L7a.

When the operator thereafter releases, relay 760 releases and relay 650 is energized from ground at break contacts 762 to return a supervisory signal and effect the operation of relay 520 which results in the release of relay 310 at normally closed contacts 522.

The release of relay 310 results in the interruption of the holding path of slow release relays 470 and 320 at contacts 313a and 312a, respectively; in the operation of relay 360 over a circuit extending from battery through the relay winding, make contacts 473 (which are still closed because of the slow release nature of relay 470) to ground on the now closed contacts 312. In turn, relay 350 operates through operated contacts 361; and relay 340 operates over a circuit extending from battery through the winding of relay 340, still operated contacts 474 of slow release relay 470 to ground at normal or back contacts 313. Upon the release of relay 470, relay 340 is held operated by operated contacts 351. At this point, attention is called to the fact that the energization of relay 340 provides a second holding path for relay 320 extending from battery through the winding of relay 320, still operated contacts 323, and make contacts 345 whereby relay 320, being slow-to-release, is reenergized before it can release.

When relay 470 releases, the holding path for relay 360 is interrupted whereby relay 360 releases at make contacts 473. In turn, the energization paths for relays 350 and 340 are broken in an obvious manner.

In order to provide peg count, peg count lead PC is grounded during the release time of slow-to-release relay 360 over a circuit extending through operated contacts 363, the busy switch, and normally closed contacts 432, 472 and 463 to ground.

The release of relay 470 also causes the release of relay 550 at contacts 478, which in turn effects the release of relay 620 in the distant carrier terminal 21'. The release of relay 620 causes the release of relay 520 in the local carrier terminal 21. When relay 340 releases, the holding path for relay 320 is broken at contacts 345. The release of relay 320 removes ground from the back sleeve lead at contacts 322.

The sequence of events which takes place when the operator releases first on an outgoing dial-to-manual call is next described. When the operator releases, relay 760 is de-energized and relay 650 of the distant carrier terminal 21' operates from ground at break contacts 761 to close contacts 652 and transmit the supervisory frequency determined by oscillator 47' with capacitor 47a' disconnected to effect the operation of relay 520 at the local carrier terminal 21. The release of relay 760 also energizes relay 640 by way of operated contacts 714 and break contacts 762 in order to open the conductors between hybrid coil HC61 and repeat coil RC71, and releases relay 720 at contacts 763. Operation of relay 520 releases relay 310 at contacts 522. Release of relay 310 breaks the holding path of slow release relay 320 at contacts 312a. The release of relay 310 also breaks the holding path of relay 470 at contacts 313a but establishes a new holding path for relay 470 over a circuit extending from battery through the winding of relay 470, now closed contacts 311, operated contacts 431 and conductor C13 to ground on operated contacts 521 of relay 520 in the local carrier terminal.

The previous operation of relay 520 also completed a circuit for operating relay 510 in the local carrier terminal 21 over a circuit extending from battery through the winding of relay 510, conductor C11 and series connected operated contacts 441 and 471a, conductor C13, and make contacts 521 to ground. Relay 630 in the distant carrier terminal 21' operates responsive to the operation of relay 510 and the consequent transmission of the outgoing supervisory signal frequency.

It will be recalled that the operation of relay 520 effected the release of relay 310. Upon the release of relay 310, relay 360 is energized over a circuit extending from battery through the winding of relay 360 and still operated contacts 473 to ground on the normally closed contacts 312. In turn, relay 350 operates over an obvious circuit.

The release of relay 310 also results in the operation of relay 340 over a circuit extending from battery through the winding of relay 340 and still operated contacts 474 to ground on normally closed contacts 313. Relay 340 is held by ground on operated contacts 351 when relay 470 finally drops out.

Upon the operation of relay 340, the holding path for relay 320 is shifted to a circuit extending from battery through the winding of relay 320, operated contacts 323 and 345 to ground.

In addition to the foregoing operations, the release of relay 310 also gives reverse battery supervision to the calling station if the call was extended over T(REV) and R(REV).

When the calling station releases thereafter, the calling loop is broken and relay 440 is released. The release of relay 440 effects the release of relay 430 and the de-energization and dropping out of relay 430 breaks the holding path for relays 470 and 510.

Upon the release of relay 470, the holding path of relay 360 is interrupted, and in turn, relays 350 and 340 are released. The release of relay 340 opens the holding circuit for relay 320, which releases.

The release of relay 320 removes ground from the back sleeve lead S.

During the release time of relay 360, peg count is made as previously described. Relay 510 in the local carrier terminal, de-energized by the release of relay 440, releases relay 630 of the distant carrier terminal 21' which in turn releases relay 710 in the distant carrier terminal. The release of this last-mentioned relay effects the release of relay 740 at contacts 717 and the release of relay 650 at contacts 713. The release of relay 740 releases relay 730 at contacts 742. The release of relay 650 effects the release of relay 520 in the local carrier terminal 21, thus, returning the circuit to normal.

*Incoming call.*—When a call over the foregoing trunk-carrier system is initiated at a manual station, the operator at manual office 24 seizes carrier trunk circuit 23 by inserting the customary plug in line jack J1. Relays 760 and 710a operate over an obvious circuit. Operation of relay 710a causes lamp L7a to light over an obvious circuit. Operation of relay 760 results in the energization of relay 610 in the carrier terminal 21' over a circuit extending from battery through the winding of relay 610, conductor C17, back contacts 716, make contacts 766, normally closed contacts 751, normally closed contacts 731 and operated contacts 768 to ground; lights the busy lamp L1 at operated contacts 764; energizes relay 720 over a circuit extending from battery through the lower winding of relay 720, operated contacts 763, conductor C18 and normally closed contacts 622 to ground, thereby completing at contacts 721 a direct current path between T-4 and R-4; and removes the idle termination comprising resistor R71 and capacitor C71 at contacts 767. As previously described, in response to the operation of relay 610, a control or signal voltage is transmitted to carrier terminal 21 to operate relay 530 at the local carrier terminal.

Closure of contacts 721 causes operation of relay 720a over leads T-4 and R-4 and opens the circuit for lighting lamp L7a at break contacts 721a. Lamp L7a, when unlighted, serves as a "stop dial" signal.

In response to the operation of relay 530, a circuit is completed to operate pulse relay 330 over a circuit extending from battery through the winding of relay 330, normally closed contacts 479b, conductor C14, and operated contacts 531 to ground. In response to the operation of relay 330, relay 460 is energized over a circuit extending from battery through the upper winding of relay 460 and operated contacts 331 to ground.

The operation of relay 460 connects tip lead T' of the incoming selector circuit through a suitable resistance to the ring lead R'. This path extends from lead T' through operated contacts 464, winding 31 of repeat coil RC41, operated contacts 461a, a resistance, which is illustrated as the lower winding of relay 410, normal contacts 324, operated contacts 462a, winding 32 of repeat coil RC41, operated contacts 465 and operated contacts 332 to lead R'.

Operation of relay 460 also removes ground from the all-trunks-busy lead ATB, the grounding path having extended from lead ATB through normal contacts 362, the busy switch, normal contacts 432, 472 and 463 to ground. This circuit is interrupted at contacts 463.

The operation of relay 460 also effects energization of relay 480 over a path extending from battery through the upper winding of relay 480 and operated contacts 463a to ground.

The operation of relay 480 places ground on the sleeve lead S in the outgoing-selector bank 8 to mark this circuit as busy over a path extending from lead S (Fig. 3) through the busy switch and make contacts 482. The operation of relay 480 also causes operation of relay 540 to prevent feedback over the carrier connection during signaling or supervision over a circuit extending from battery through the winding of relay 540, conductor C16, and make contacts 483 to ground at break contacts 452; the idle termination comprising resistance R41 and capacitance C41 is also employed as a spark suppressor in series with pulsing contacts 332, the pulsing circuit now extending from lead T through break contacts 458 and 444, capacitance C41, resistance R41, make contacts 488, 332 and 465 to lead R.

The resistance loop on the tip and ring leads, T' and R', results in the conventional seizure of the incoming selector. Ground is returned from the incoming selector on the sleeve lead S' in conventional manner (not shown) to hold operated relay 460 over a circuit extending from battery through the lower winding of relay 460, make contacts 466 and lead S'. The sleeve lead ground is forwarded through normal contacts 451 of relay 450, operated contacts 487 and conductor C15 to relay 550 in the local carrier terminal. The resultant operation of relay 550 causes transmission of a control or supervisory signal to the distant carrier terminal 21' to operate relay 620 in the remote carrier terminal. Operation of relay 620 results in de-energization of relay 720 at contacts 622 and operation of relay 730 over a circuit extending from battery through the winding of relay 730, break contacts 741, conductor C19 and make contacts 621 to ground.

Operation of relay 730 provides an alternate path for the busy lamp L1 at operated contacts 732; and energizes relay 740 over a circuit extending from battery through the winding of relay 740, operated contacts 735, normal contacts 718 and operated contacts 765 to ground. Relay 730 in its energized condition, transfers ground for maintaining relay 610 energized at contacts 621 from break contacts 731 to transfer contacts 734. Relay 740, when operated, transfers relay 730 from ground at contacts 621 to ground at contacts 742.

The release of relay 720 opens the loop comprising leads T-4 and R-4 and the operator's cord circuit at contacts 721, thereby releasing relay 720a. Lamp L7a lights upon the closure of contacts 721a and constitutes a "start dial" signal.

The operator now plugs into jack J2 the conventional dial cord and thereby energizes relay 750 over a circuit extending from battery through the winding of relay 750 to ground at one of the terminals of jack J2. The operator now dials the desired digits and relay 750 follows the dial pulses and interrupts the circuit for relay 610 at break contacts 751 so that relay 610 also follows the dial pulses. In turn, as will be understood from the foregoing description, relay 530 at the local carrier terminal in turn follows the dial pulses. In response to the pulsing of relay 530, the holding path of relay 330 is likewise pulsed at contacts 531 in accordance with the dial pulses and relay 330 follows the dial pulses.

Upon the first release of relay 330, the shunt relay 420 operates over a circuit extending from battery through the winding of relay 420, operated contacts 467 and pulsing contacts 333 to ground. Operation of relay 420 results in the connection of tip lead T' directly to ring lead R' at make contacts 421 in order to shunt out repeat coil RC41 and the resistance of the lower winding of relay 410 in order to prevent pulse distortion. The shunt path extends from lead T' through operated contacts 464, 421, 484, 465 and 332 to lead R'.

Upon the first re-operation of relay 330, relay 410 is operated over a circuit extending from battery through the upper winding of relay 410, operated contacts 422, break contacts 411 and operated contacts 331 to ground. Relay 410 is held operated through contacts 422 and transfer contacts 413.

Operation of relay 410 removes resistance ground from and substitutes resistance battery on the HS' lead in order to identify the call as a toll call. The previous resistance ground extended from lead HS' through a suitable resistance (shown as the upper winding of relay 450) to battery at break contacts 412. Upon the operation of relay 410, the upper winding of relay 450 is transferred from ground to battery through operated contacts 414 and operated contacts 485. Relay 420 is slow-to-release and, hence, relays 420 and 410 remain operated during each train of dial pulses but at the end of each pulse series, relay 420 drops out and carries with it relay 410. Relay 750 is released when the operator at manual office 24 withdraws the dial plug (normally after dialing).

Figure 16:
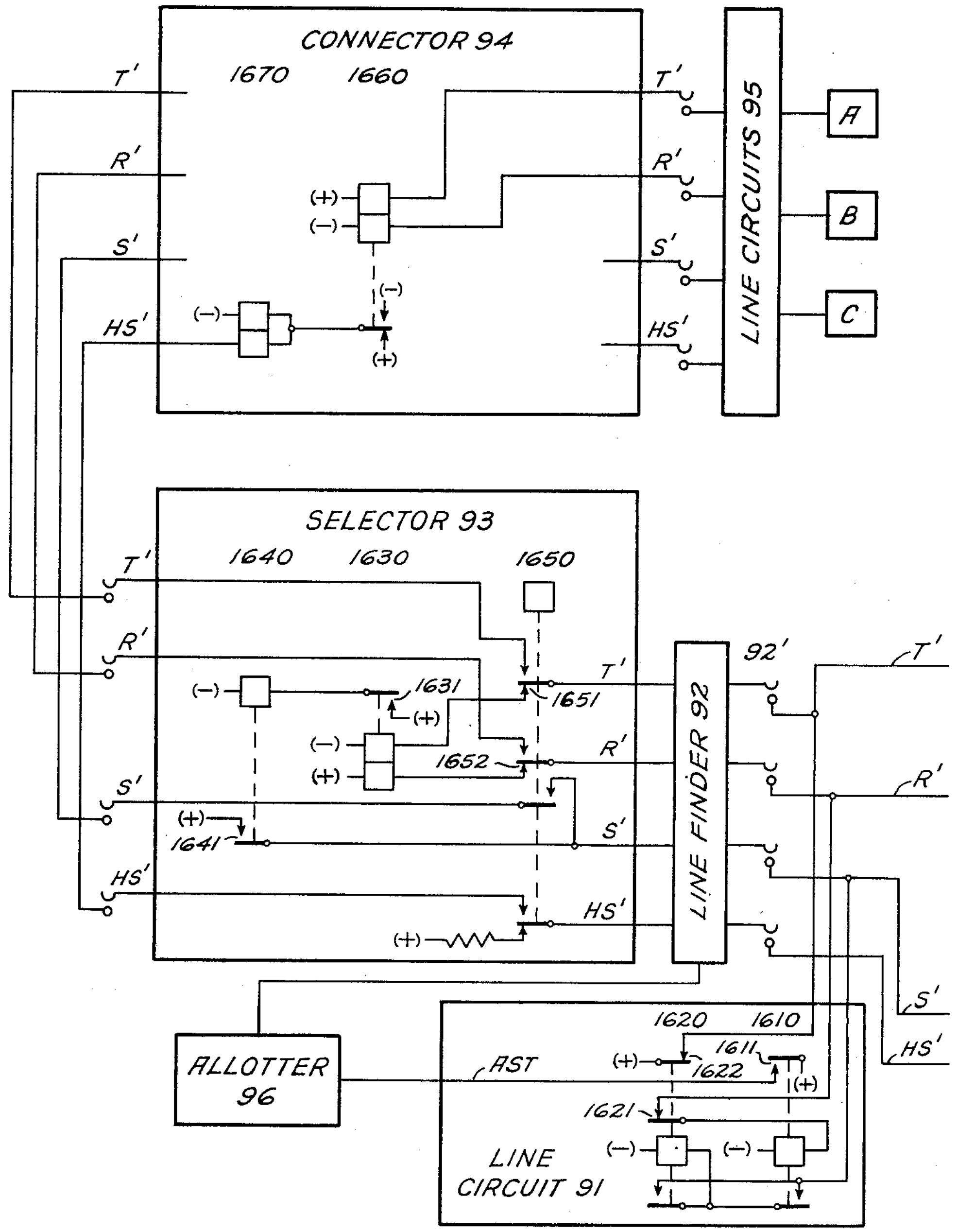

When the called party, as, for example, the substation associated with line 1, answers, resistance battery is placed on the HS' lead in any suitable manner (as by an answering relay such as relay 1660 energized upon answering and selector switch through relay 1650 as shown in Fig. 16) to operate relay 450 over a circuit extending from lead HS' through the upper winding of relay 450 to ground at normally closed contacts 412.

Operation of relay 450 releases relay 540 at normally closed contacts 452. The idle termination comprising R41 and C41 is opened at contacts 458. The operation of relay 450 also causes the operation of relay 350 over a circuit extending from battery through the winding of relay 350 and operated contacts 454 to ground. In turn, relay 340 operates over an obvious path. Relay 340 completes a circuit at operated contacts 346 to lock up relay 330 at contacts 331.

Operation of relay 450 also releases relay 550 in the local carrier terminal 21 at break contacts 451. The de-energization of relay 550 results in the release of relay 620 at the distant carrier terminal 21' in the manner previously described.

Upon the release of relay 620, relay 610 is released at contacts 621, thereby removing the supervisory signal from link 18 and releasing relay 530 in the local carrier terminal; and relay 720 is re-operated by way of now closed contacts 622 and operated contacts 763. The conversation loop is now completed and conversation may proceed. Again, it is to be noted that all the carrier terminal relays are in their de-energized or released positions during conversation.

When the called party, i. e., the party at the dial end of the extended call, hangs up, the resistance battery on lead HS' is replaced by resistance ground in any suitable manner, not shown, thereby applying ground to both terminals of the upper winding of relay 450 to effect the release of relay 450 and to light the monitor lamp MON over a circuit extending to ground from the lamp through normally closed contacts 453 and operated contacts 486.

The release of relay 450 allows relay 540 in the local carrier terminal 21 to reoperate over a circuit extending from battery through relay 540, operated contacts 483 and normally closed contacts 452 to ground. The release of relay 450 also opens the holding path to slow release relay 350 at contacts 454 and re-closes the idle line termination. When relay 350 finally releases, relay 340 is de-energized.

Relay 550 is also re-operated upon the release of relay 450 from ground on sleeve lead S' through closed contacts 451, operated contacts 487 and conductor C15.

The switch associated with the incoming selector 25 is not released because relay 330 remains operated and thus maintains the loop closed at operated contacts 332.

Reoperation of relay 550 in the local carrier terminal 21 results in the operation of relay 620 in the distant carrier terminal 21' in order to give operator disconnect supervision. The operation of relay 620 de-energizes relay 720 at contacts 622 to open contacts 721, thereby releasing relay 710a and completing a circuit for operating supervisory lamp L7a.

Relay 610 operates over a circuit extending from battery through the winding of relay 610, conductor C17, break contacts 716, operated contacts 766, break contacts 751, transfer contacts 734 and operated contacts 621 to ground. Closure of contacts 611 renders operative oscillator 47' to transmit a supervisory signal to terminal 21. Appearance of voltage in the output of filter 48 of terminal 21 operates relay 530 in the local carrier terminal 21. Operation of relay 530 supplies a holding ground to relay 330 over a circuit extending from ground, operated contacts 531, conductor C14, and break contacts 479b to the winding of relay 330. Under the present circumstances, no peg count is made because relay 360 is not operated.

When the operator withdraws the plug from jack J1 at the manual office, relay 760 releases to reclose the idle line termination. Relay 650 operates in response to the release of relay 760 over a circuit extending from battery, winding of relay 650, conductor C21, make contacts 736, and break contacts 761 to ground to open the talking loop at contacts 651. The operation of relay 650 causes operation of relay 520 as explained previously but operation of relay 520 at this time has no effect. Relay 610 releases at contacts 766 to release relay 530 at the local carrier terminal 21. Relay 740 releases at contacts 765.

The release of relay 330 follows the release of relay 530 because its holding circuit is broken at formerly operated contacts 531. In response to the release of relay 330 the conversation loop is opened at contacts 332, thereby releasing the incoming selector and succeeding circuits. As a result of the release of the incoming selector, ground is removed from sleeve lead S', thereby releasing relay 550 in the local carrier terminal 21 and causing the subsequent release of relay 620 in the distant carrier terminal 21'.

Upon the release of slow-to-release relay 740, relay 730 is disconnected from ground at contacts 742. The release of relay 730 de-energizes relay 650 at contacts 736. Release of relay 650 at the distant carrier terminal and consequent disconnection of the carrier frequency output of oscillator 47' at contacts 652 effects the release of relay 520 at the local carrier terminal.

The release of relay 330 causes de-energization of relay 460 at contacts 331 and the release of relay 460 de-energizes relay 480 at contacts 463a. The release of relay 480 extinguishes lamp MON at contacts 486; effects the release of relay 540 at contacts 483; and removes ground from sleeve lead S to the selector bank at contacts 482. The system is now ready for another call.

The sequence of events following calling party release, as exemplified by the operator's withdrawal of the cord circuit from jack J1, follows.

Relay 760 is de-energized at jack J1 and releases. In response to the release of relay 760, lamp L1 is turned off at contacts 764; the idle termination is applied across leads T-4 and R-4 at break contacts 767; relay 740 is de-energized at contacts 765 to restore the holding path for relay 730 to ground by way of contacts 741 and 621 upon the operation of relay 620 during the release time of relay 730; relay 650 is energized over conductor C21, operated contacts 736 and closed contacts 761; and relay 720 is de-energized at contacts 763 and releases to insert capacitor C72 between leads T-4 and R-4.

The operation of relay 650 effects operation of relay 520. The closure of contacts 521 extends ground to relay 320 by way of conductor C13 and operated contacts 456. The operation of relay 320 completes a circuit for energizing relay 550 by way of conductor C15, operated contacts 487, 455 and 325 and normal contacts 319b to ground at normal contacts 435; and establishes a circuit for lighting lamp MON (Fig. 3) by way of operated contacts 457 and 326. In response to the operation of relay 550, relay 620 is energized to complete the above-mentioned holding circuit for relay 730.

When the called party at the dial end hangs up, the automatic switches are released in conventional manner and the HS' lead is transferred to ground in any suitable manner not shown. The presence of ground on both terminals of relay 450 effects the release thereof.

The release of relay 450 causes the release of relay 350 at contacts 454. In turn, relay 350, upon its delayed release, de-energizes relay 340.

Upon release of relay 340, the circuit for energizing relay 330 is opened at contacts 346 thereby releasing relay 330; and relay 320 is de-energized at contacts 345.

The release of relay 330 effects the de-energization of relay 460 at contacts 331, and the release of relay 460 de-energizes relay 480 by opening contacts 463a. Upon the release of relay 480, the idle termination (R41 and C41) is restored.

Referring back to the release of relay 450, relay 550 is de-energized by the release thereof at contacts 455. Release of relay 550 causes the release of relay 620. Release of relay 620 de-energizes relay 730 at now open contacts 621.

Responsive to the release of relay 730, relay 650 is de-energized at contacts 736, whereupon relay 520 is also released by the disappearance of output at filter 49. The release of relay 650 effects the release of relay 520.

Previous mention has been made of the use of a signal device at the operator's position in manual office 24 such as lamp L7a as a "start dial" signal on calls originating at the manual office 24. Specifically, on an incoming call, i. e., a call instituted from the manual end, carrier trunk circuit 23 is seized upon plugging the operator's cord circuit into line jack J1. The consequent operation of relays 760 and 710a in series causes the momentary lighting of lamp L7a through contacts 711a and 721a. However, relays 610 and 720 operate almost instantly thereafter to energize relay 720a at contacts 721 and the circuit for lamp L7a is broken at break contacts 721a. Lamp L7a now constitutes a "stop dial" signal.

The foregoing specification also describes the release of relay 720 in response to the seizure of incoming selector 25 and the lighting of lamp L7a following the release of relay 720a and the closure of contacts 721a, lamp L7a now providing a "start dial" signal.

Referring to Fig. 3, leads T', R', S' and HS' may be extended to an incoming selector or to a line circuit as indicated in Fig. 1 by the dashed line and Fig. 16. If the incoming call is extended to a subscriber A, B or C of Fig. 16 by way of line circuit 91, selector 93, and connector 94, the "start dial" signal provision is quite important because dialing should not start until the seized line circuit 91 has been found by the allotted finder 92. Figs. 1 and 16 illustrate suitable connections whereby a "start dial" signal is forwarded upon seizure of the selector assigned to the allotted finder.

Referring to Fig. 16, upon the operation of relay 460, line relay 1610 of line circuit 91 is operated over a circuit extending from battery through the winding of line relay 1610, break contacts 1621 of cut-off relay 1620, lead R'; operated contacts 332 and 465, winding 32 of repeat coil RC41, operated contacts 462a, break contacts 324, the lower winding of relay 410 (which serves as a resistor), operated contacts 461a, winding 31 of repeat coil RC41, operated contacts 464, lead T' and break contacts 1622 to ground.

Line relay 1610 operates to ground the start lead AST at operated contacts 1611. The finder switch 92' associated with line finder 92 is caused to seek the calling loop T'—R', which is connected into finder bank 92', in any desired fashion. Upon the finding of the terminals corresponding to the calling trunk the calling bridge relay 1630 of selector 93 is operated over leads T' and R' and break contacts 1651 and 1652, respectively. At contacts 1631, delay relay 1640 is operated. The operation of relay 1640 applies ground through operated contacts 1641, finder 92 and finder switch 92' to lead S'.

As previously described, ground on lead S' effects operation of relay 550 in carrier terminal 21 to cause the transmission of a supervisory control signal to remote carrier terminal 21' where relay 620 is operated to release relay 720. The opening of contacts 721 releases relay 720a which causes lamp L7a to be lighted over a circuit including break contacts 721a as a "start dial" signal.

DIAL-TO-MANUAL

*Second circuit*

Figure 7:
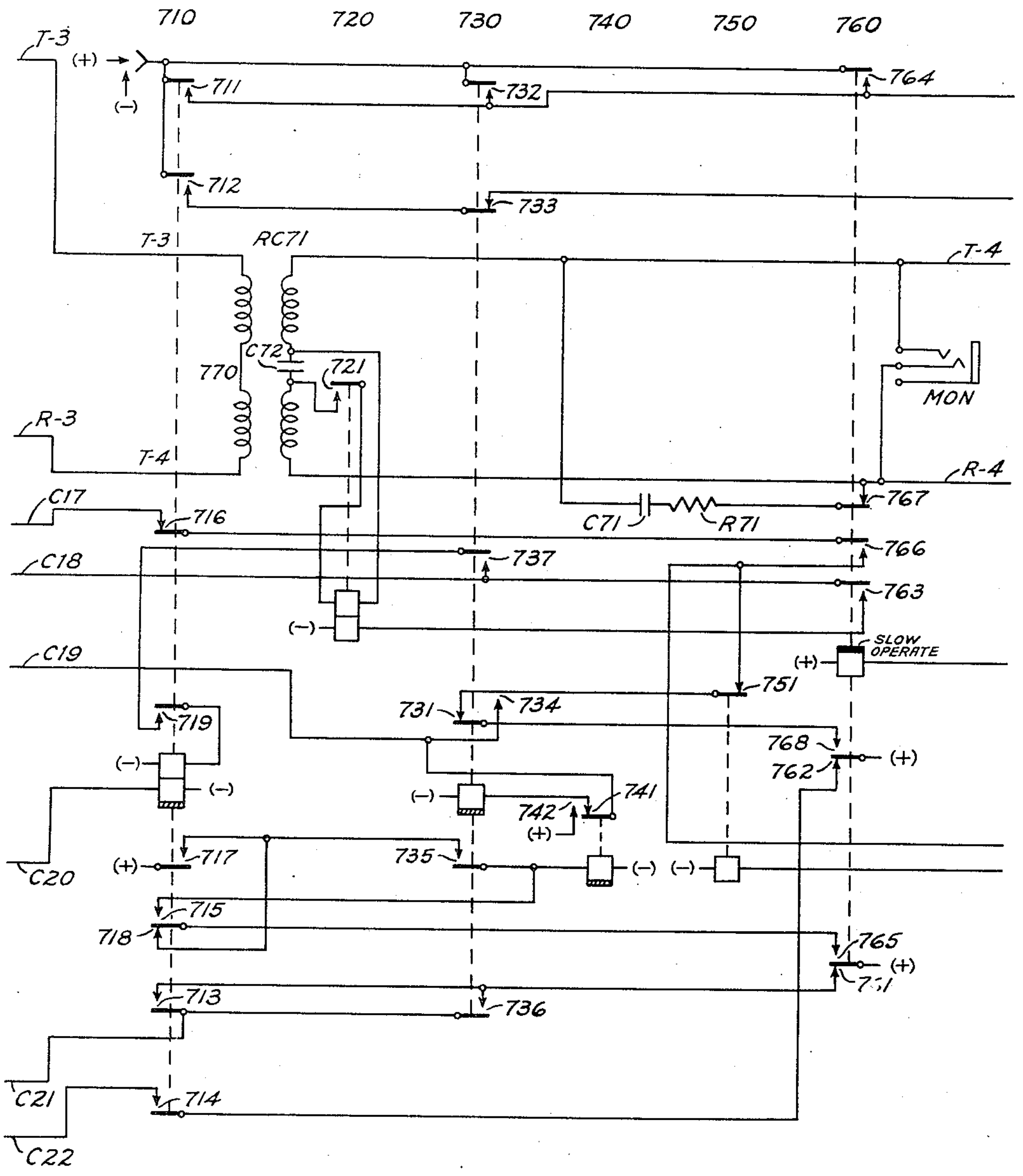
Figure 7A:
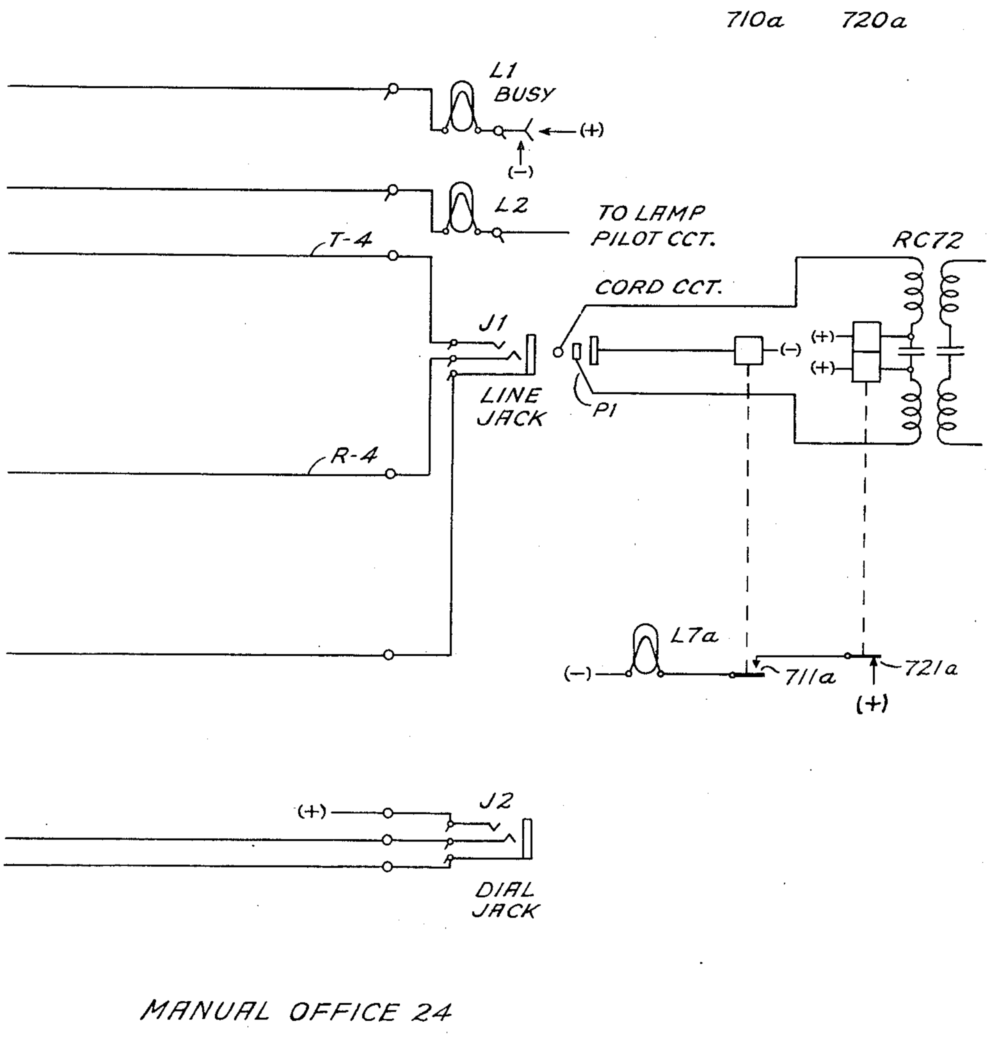
Figure 8:
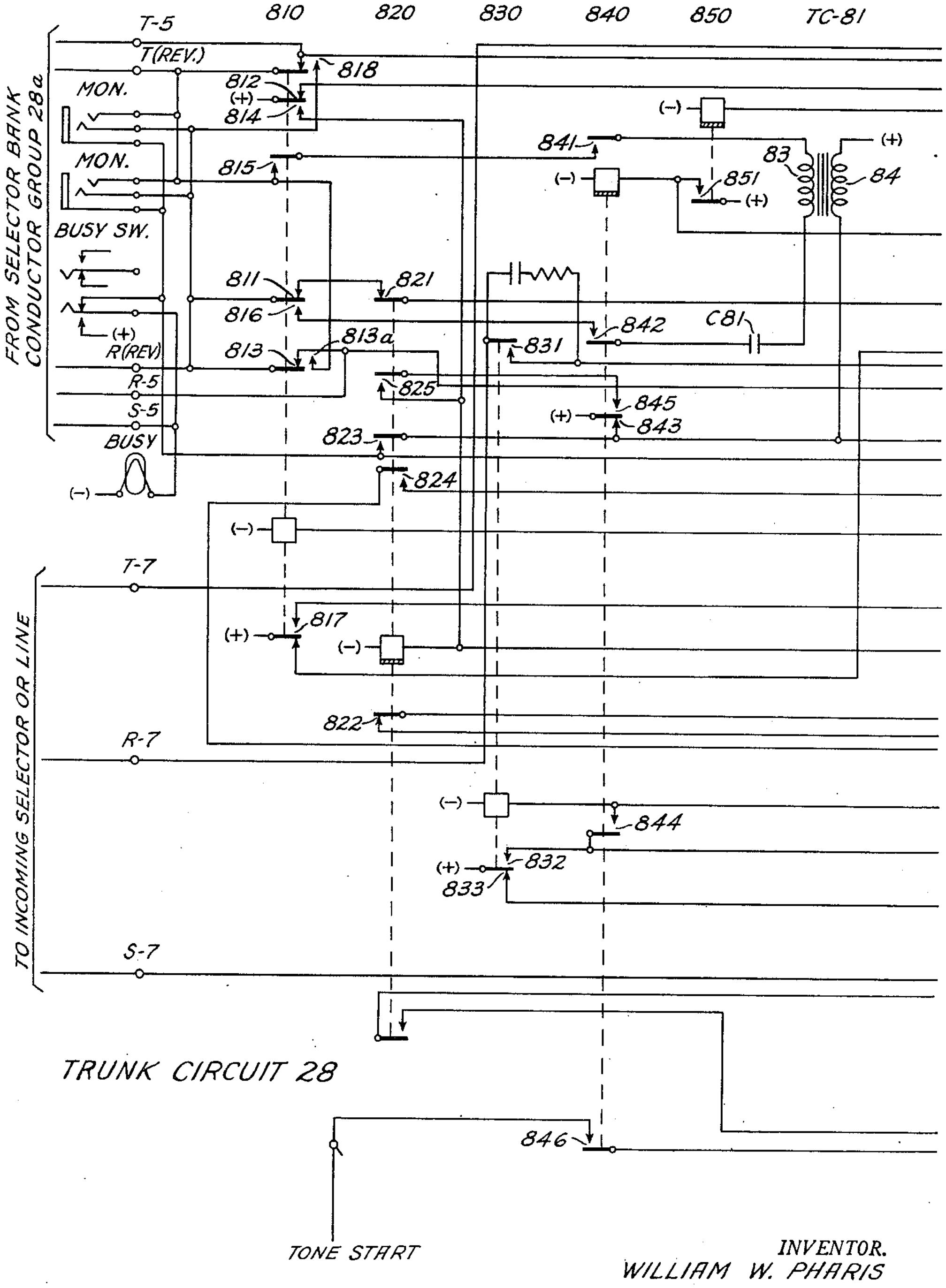
Figure 9:
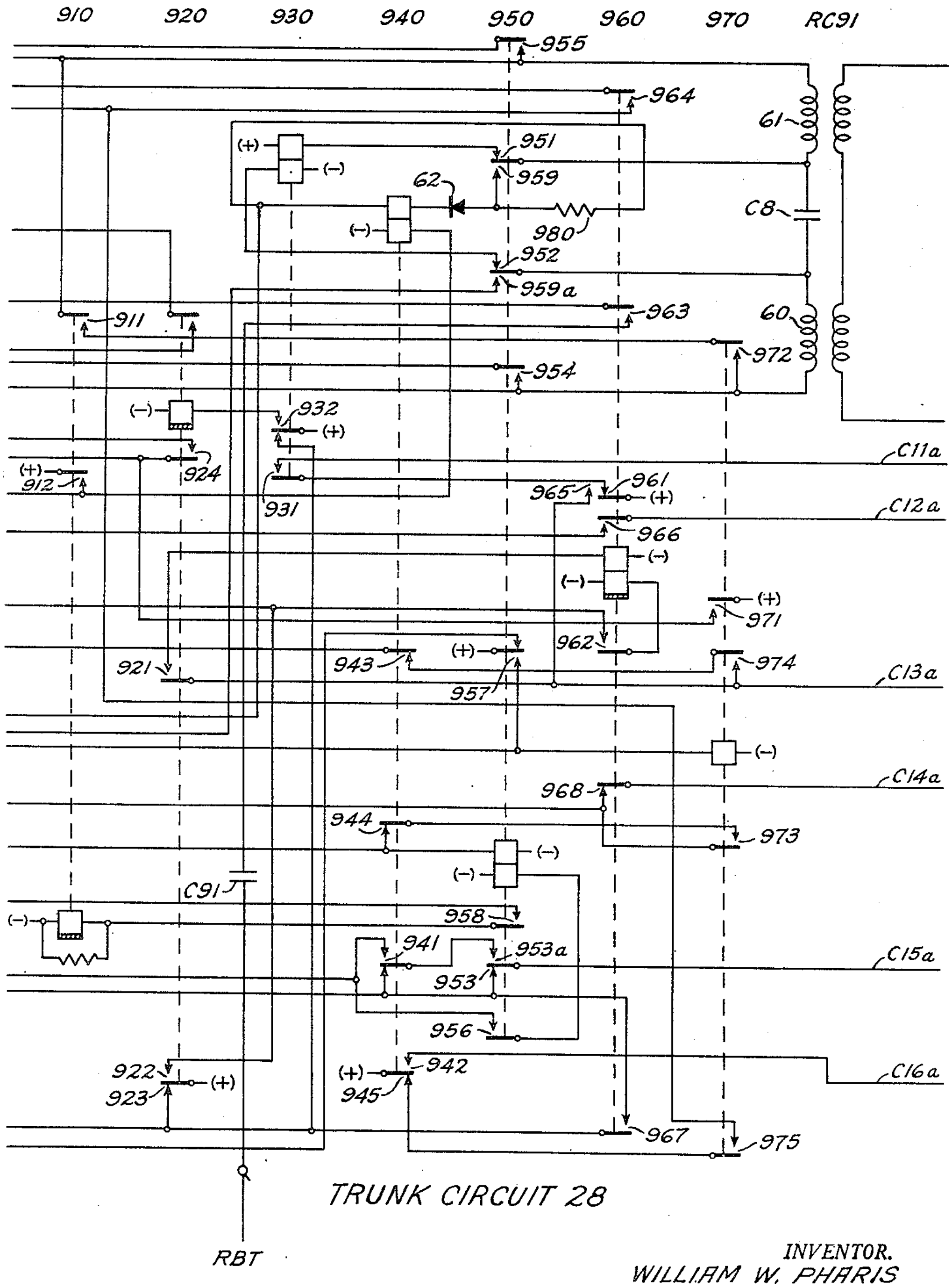

There is illustrated in Figs. 8 and 9 a second carrier trunk circuit for use in dial-to-manual carrier systems. The arrangement shown in Figs. 8 and 9 is similar to the carrier trunk circuit disclosed in Figs. 3 and 4, a primary difference being the omission of the HS lead of Figs. 3 and 4. For this reason the description of the circuits of Figs. 8 and 9 and their connection to carrier terminal 21 (Fig. 5a) is less detailed than the preceding description. The manual end may be the same as that disclosed in Figs. 7 and 7a.

The carrier trunk circuit of Figs. 8 and 9 is intended to provide a number of principal functions. On outgoing calls appropriate signals are sent to the manual end by way of the carrier equipment to indicate the presence of a calling condition, revertive ringing tone is given the calling party and reverse battery answering supervision is included. Coin box tone is provided when paystations are included in the system, and the trunk circuit also provides for recall of the manual operator from a dial station, furnishes answering supervision to the manual end over the associated carrier equipment, repeats pulses to the associated switching equipment on incoming calls, and provides for CLR holding.

*Outgoing call.*—On a call extended into the ninth level of the local selector 6, carrier trunk 26 is seized by closing the calling loop to operate calling bridge relay 930 over tip and ring leads T-5 and R-5, contacts 951 and 952 and repeat coil RC91. The energization of relay 930 completes a circuit for operating relay 510a (Fig. 5a) in the local carrier terminal 21 over a circuit extending from the winding of relay 510a to ground over a circuit including conductor C11a, operated contacts 931 and break contacts 961. Operation of relay 510a effects the transmission of the supervisory signal frequency to the manual office 24, as hereinbefore described, to operate relay 630a from filter 46a' and to apprise the manual operator that a call requires attention.

The energization of relay 930 also effects the operation of relay 920 over an obvious circuit including contacts 932. Relay 920 prepares a path for energizing the upper winding of relay 960 at contacts 921, and grounds the back sleeve lead S-5 over a circuit extending from lead S-5 through the busy switch, and operated contacts 924 to ground at break contacts 843.

As previously described, when the operator at the manual office plugs into a jack corresponding to J1 of Fig. 7a, relay 650a is caused to operate to transmit a supervisory signal to operate relay 520a in local carrier terminal 21. The operation of relay 520a completes the path for energizing the upper winding of relay 960 at make contacts 521a.

Upon operating, relay 960 locks up to ground through a circuit extending from the lower winding of relay 960 through make contacts 962 and make contacts 922. The energization of relay 960 causes ring back tone to be extended to the calling station on the ring side of the line over a circuit extending from the ring back tone lead RBT through capacitor C91, make contacts 963 and break contacts 821, 811 and 813 to ring lead R-5. The energization of relay 960 also completes an operating circuit for relay 850 at contacts 964 to ground at break contacts 812. The operation of relay 960 also establishes a circuit for maintaining operated carrier terminal relay 510a during the dialing period over a circuit extending from the winding of relay 510a by way of conductor C11a, operated contacts 931, 965 and 521a to ground.

The energization of relay 850 completes a circuit for operating relay 840 at contacts 851. The operation of relay 840 prepares a circuit for placing the winding 83 of tone coil TC81 across the tip and ring leads at contacts 841 and 842, respectively, and grounds the tone start lead at operated contacts 846.

As previously described, when the manual operator at office 24 answers the call, relays 640a and 650a are released, the latter causing the release of relay 520a, which thereby effects the operation of relay 810 over a circuit extending from the winding of relay 810 through make contacts 966, conductor C12a, and break contacts 522a, and releases relay 510a at contacts 521a.

The operation of relay 810 closes a path for energizing relay 820 at make contacts 814; completes the path for coin box tone by placing the secondary winding 83 of tone coil TC81 across the tip and ring leads T-5 and R-5, respectively, over a circuit extending from lead T-5 through operated transfer contacts 818, operated contacts 816 and 842, capacitor C81, winding 83 of tone coil TC81, make contacts 841 and 815, and transfer contacts 813a to ring lead R-5; and connects the lower winding of relay 960 to ground through make contacts 962 and 817. The operation of relay 810 also reverses battery to the calling selector and opens the path for maintaining energized relay 850 at break contacts 812.

The operation of relay 820 completes the coin box tone primary circuit from a suitable source of tone as by way of lead S-5, operated contacts 823 and primary winding 84 of tone coil TC81. Relay 850 is of the slow-to-release type so that after a short interval of time, relay 850 releases and opens the operating circuit for relay 840. This latter relay is also of the slow-to-release type and drops out after a short time interval to remove coin box tone from the line at contacts 841 and 842.

The operator may verify the coin box tone by withdrawing and reinserting plug P1. If the interval is sufficient to permit the relay corresponding to relay 760 of Fig. 7 to restore upon withdrawing the plug, relay 650a is re-energized to cause transmission of a supervisory signal which effects the energization of relay 520a in the dial termination of the carrier equipment and de-energizes relay 810 at contacts 522a. Relays 850 and 840 are then reoperated, the former by way of contacts 812 and 964. Relay 820 is held energized from ground at contacts 845. When the operator replugs, relay 520a is released by the re-energization of the relay corresponding to relay 760 and consequent release of relay 650a. Relay 810 reoperates, applying coin box tone to the line until the release of relay 840. Revertive ringing tone is withheld from the line during this operation because relay 820 remains operated and the revertive tone path is open at contacts 821.

The connection is now established for conversation.

When the calling party hangs up, the interruption of the loop including the windings of relay 930 effects the de-energization of relay 920 at operated contacts 932 and the circuit is released. Relay 960 remains operated through its own contacts 962 and operated contacts 817. The connection is held up, however, because ground is held on the back sleeve lead S by way of busy switch contacts, and operated contacts 823 and 843.

When slow-to-release relay 920 releases, relay 540a in the local carrier terminal 21 is operated over a circuit extending from the winding of relay 550a by way of conductor C15a, break contacts 953, make contacts 967 and now-closed contacts 923 to ground. The operation of relay 550a also causes the transmission of the supervisory signal to the manual office for operator supervision.

Figure 6A:
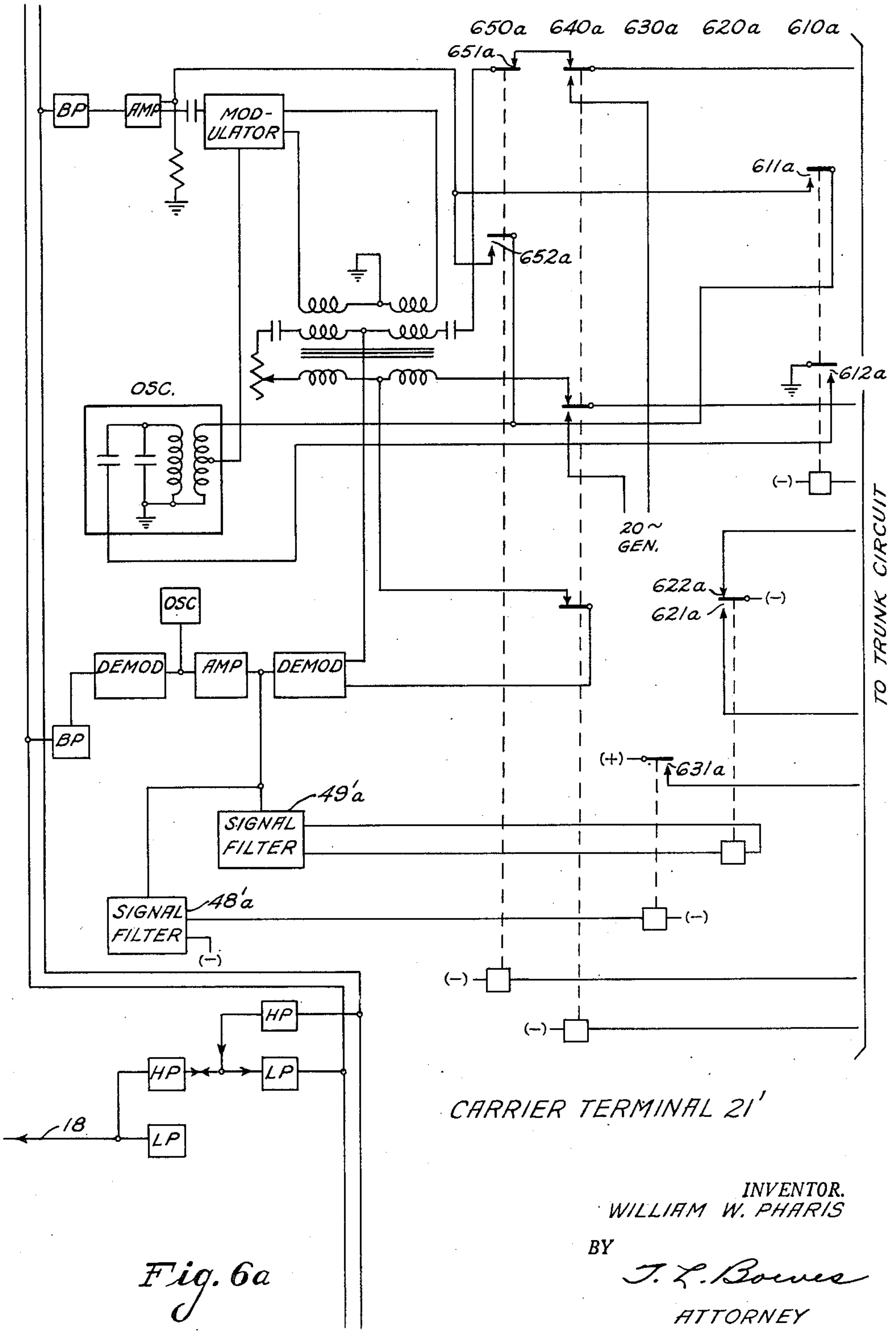
Figure 6B:
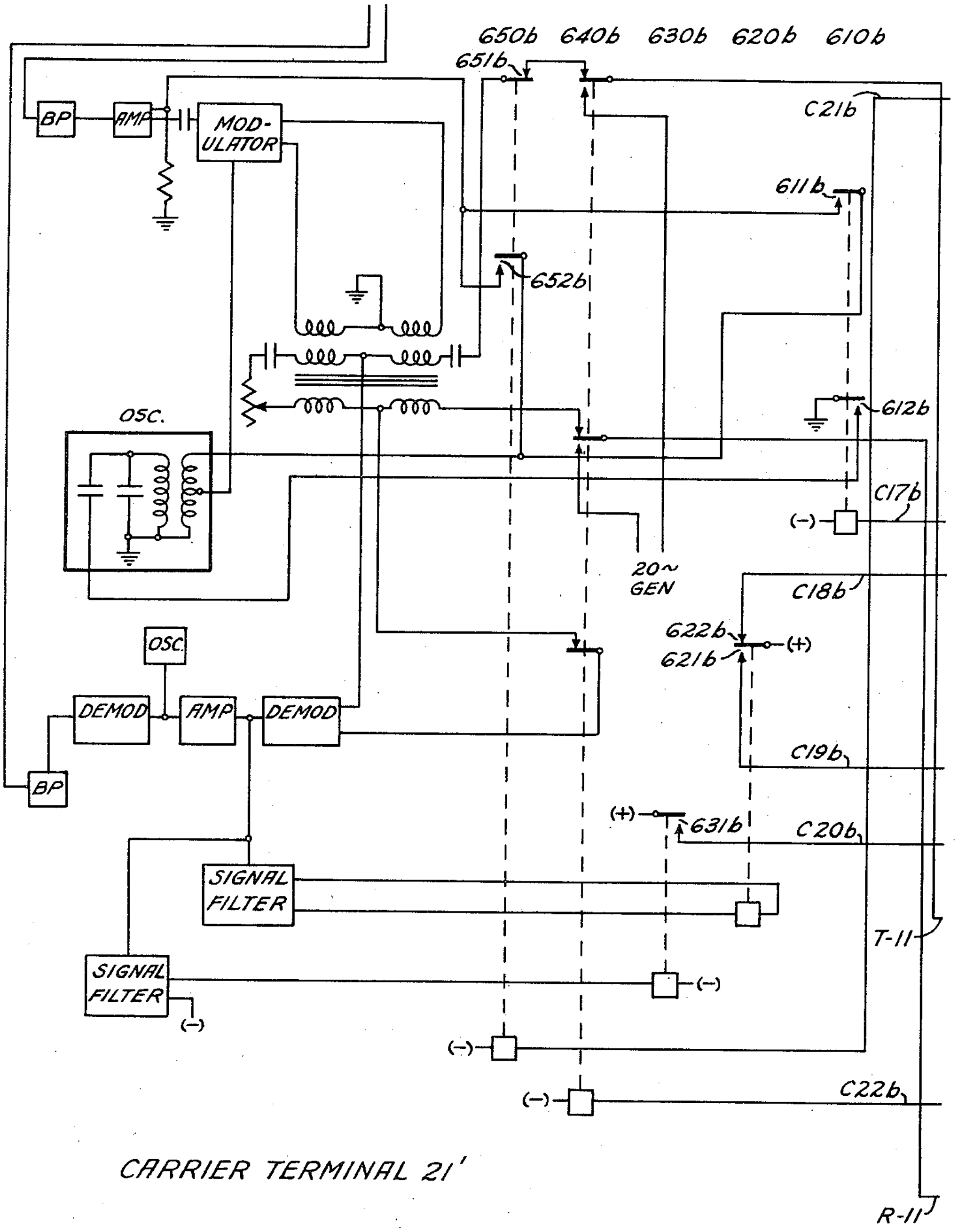

The calling party cannot be recalled by the operator. The calling party, however, can recall the operator by operating his hookswitch to pulse relays 930 and 920. In turn, relay 550a is pulsed at contacts 923 which causes relay 620a (Fig. 6a) to pulse and the operator's lamp L2 in the associated manual office to flash. When the operator removes plug P1, the manual end is released as described in connection with Figs. 7 and 7a.

Figure 5A:
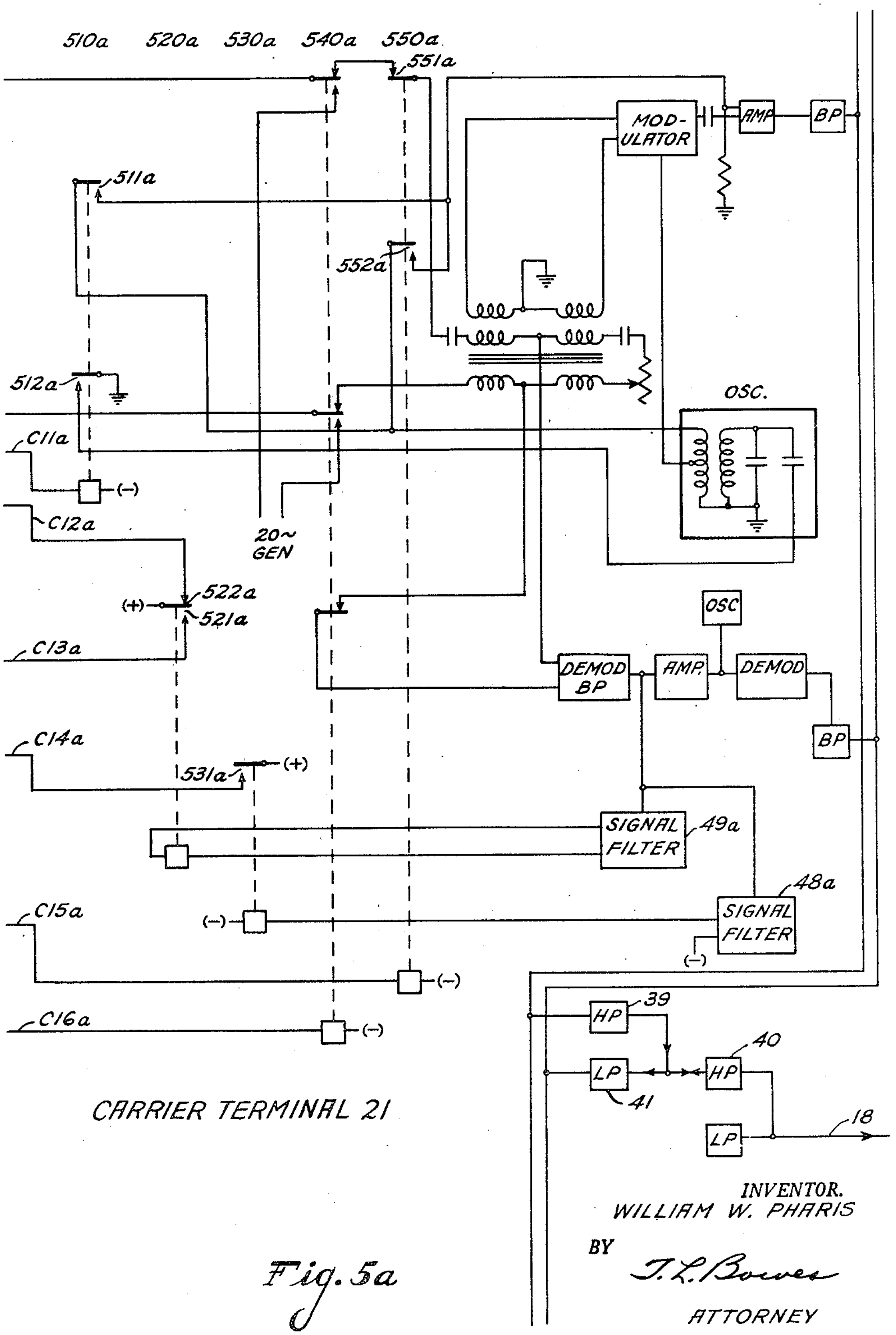
Figure 5B:
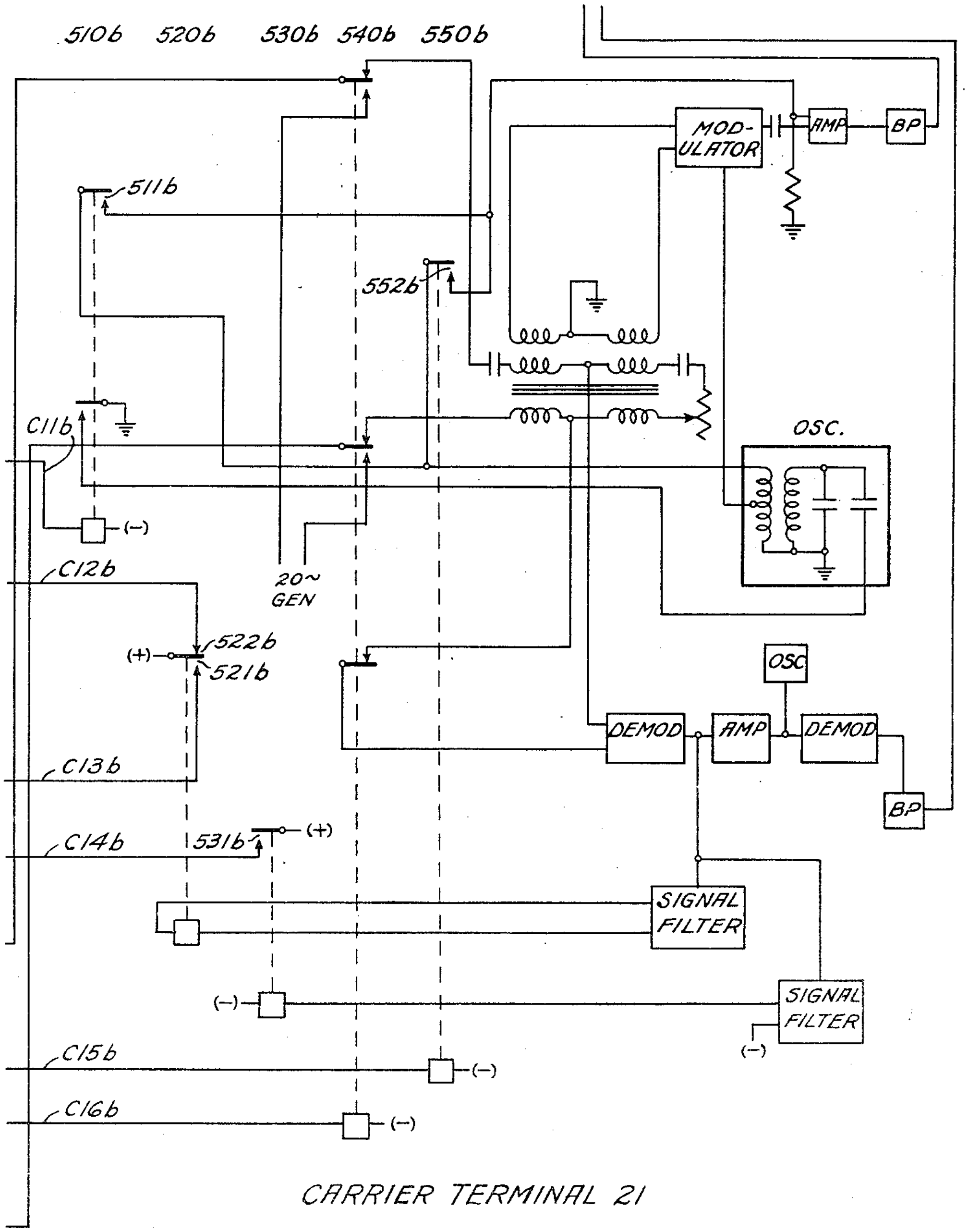

If the manual operator disconnects first, a signal is received from the manual termination of the carrier equipment which effects the operation of relay 520a in the dial termination shown in Fig. 5a. Operation of relay 520a causes the release of relay 810 by opening contacts 522a and operates relay 510a through make contacts 931, 965 and 521a. When the calling party releases, relays 930 and 920 release. The release of relay 920 opens the circuit to the windings of relay 960 and that relay releases. During the release time of relay 960, ground is forwarded from contacts 923 through still-operated contacts 967, contacts 953, and conductor C15a to pulse relay 550a which serves to pulse relay 620a in the remote terminal 21' to release the manual end of the call as described in connection with Figs. 7 and 7a.

*Incoming call.*—On a call from the manual end to the dial exchange, the carrier trunk circuit of Figs. 8 and 9 is seized when a dial signal is received from the manual office 24 to operate relay 530a as hereinbefore described. The operation of relay 530a operates pulsing relay 830 over a circuit extending from the winding of relay 830 through break contacts 968, conductor C14a and make contacts 531a to ground.

The operation of pulsing relay 830 energizes relay 950 over a circuit extending from ground at make contacts 832 to the winding of relay 950. Relay 950 locks in over a circuit including the lower winding of relay 950, operated contacts 956 and sleeve lead S-7 to sleeve ground (not shown). Upon the operation of relay 950, a circuit is completed for closing the loop to the incoming selector or line circuit and operating relay 940 over a circuit extending from ring lead R-7 through make contacts 831 and 954, winding 60 of repeat coil RC91, operated contacts 959a, break contacts 822, the upper winding of relay 940, rectifier 62, make contacts 959, winding 61 of repeat coil RC91, and make contacts 955 to tip lead T-7. In response to the operation of relay 940, relays 540a and 550a are energized as previously described.

As a further result of the energization of relay 950, relay 970 operates over a circuit to ground through make contacts 957. Upon the operation of relay 970, the sleeve lead S-5 of the outgoing selector bank is grounded over a circuit extending from sleeve lead S-5, break contacts of busy switch BSY and make contacts 971 to ground.

Upon the first de-energization of the pulsing relay 830, shunt relay 910 is energized over a circuit including the winding of relay 910, make contacts 958 and break contacts 833. Relay 910 is provided with slow-to-release characteristics and remains operated over the duration of each group of pulses. Relay 910 completes a path for shunting repeat coil RC91 and the upper winding of relay 940 over a circuit extending from the upper terminal of the upper winding 61 of repeat coil RC91 through make contacts 911 and make contacts 972 to the lower end of the lower winding 60 of the repeat coil. Even though the upper winding of relay 940 is thus shunted, relay 940 remains operated through its lower winding and operated contacts 912.

When the called party answers, the polarity of the tip and ring leads is reversed in any suitable manner, not shown. The polarity of rectifier 62 is such as to block current flow through relay 940 after polarity reversal and hence permits relay 940 to release. Upon the release of relay 940, relay 830 locks up to ground over a circuit extending from battery through the winding of relay 830, operated contacts 973, break contacts 944 and operated contacts 832.

The release of relay 940 also opens the operating paths of relays 540*a* and 550*a* at contacts 942 and 941, respectively. As a result of the release of relay 550*a*, relay 620*a* releases. Relay 610*a* releases and effects the release of relay 530*a*.

Relay 850 operates responsive to the release of relay 940, the energization circuit extending from battery through the winding of relay 850 and operated contacts 975 to ground on break contacts 945. Operation of relay 850 completes an obvious path to operate relay 840.

The holding path for relay 830 is now completed to ground through operated contacts 844 and 832, the closure of contacts 844 shunting contacts 973 and 944 which formerly constituted part of the holding circuit.

The connection is now complete for conversation.

If the called party (dial end) hangs up, the polarity of tip and ring is reversed in conventional manner and relay 940 reoperates.

The operation of relay 940 effects the energization of relay 540*a* at contacts 942 and relay 550*a* from sleeve ground over a circuit extending from sleeve lead S–7 through operated contacts 941 and 953*a* and conductor C15*a*.

In response to the operation of relay 550*a*, relays 620*a* and 610*a* are caused to operate in turn, as described above. Operation of relay 610*a* results in the operation of relay 530*a* in the dial end of the carrier equipment.

Even though the called party has hung up, the connection is maintained in the manner previously described.

If the called party wishes to recall the operator, he may do so by slowly flashing his hook-switch. Relay 940 pulses in accordance with the flashing of the hook-switch and causes relays 540*a* and 550*a* to pulse similarly. As a result, relay 630*a* is pulsed to signal the operator, as by flashing a lamp.

When the operator unplugs, relay 650*a* is caused to pulse which causes relay 520*a* to pulse. In response to the operation of relay 520*a*, relay 820 is energized over a circuit extending from battery through the winding of relay 820, break contacts 943, operated contacts 974, conductor C13*a* and operated contacts 521*a* to ground.

The operation of relay 820 opens the loop including leads T–7 and R–7 at break contacts 822; and re-energizes relay 940 through its lower winding by way of operated contacts 824 and 957. Relay 820 holds operated from ground on operated contacts 845 through operated contacts 825.

Upon operation of relay 940, relay 850 is de-energized at contacts 945 and upon its release relay 840 is de-energized. Upon the release of relay 840, relay 820 is de-energized. The holding path for relay 830 is broken at now open contacts 844 and relay 830 releases.

The remaining operated relays are released as described in connection with the first dial-to-manual circuit. The opening of the tip and ring loop releases the associated switch circuit.

If the operator releases first by unplugging, relay 650*a* is energized to cause relay 520*a* to pulse. Relay 820 operates from ground on operated contacts 521*a* over a circuit comprising conductor C13*a*, operated contacts 974 and break contacts 943. Operation of relay 820 opens the loop over leads T–7 and R–7 at contacts 822, and operates relay 940 through its lower winding, operated contacts 824 and 957 to ground. Relay 820 holds operated over a circuit extending from battery through the winding of relay 820, operated contacts 825 and 845 to ground.

Operation of relay 940 releases relay 850 at contacts 945. Release of relay 850 de-energizes relay 840 by opening contacts 851. Relay 820 is released when contacts 845 open and relay 940 releases upon the opening of contacts 824. The holding path for relay 830 is broken at contacts 844.

The opening of the tip and ring leads T–7 and R–7, respectively, causes the associated switching circuits to release. Loss of ground on sleeve lead S–7 releases relay 950 and relays 970 and 910 follow. The carrier terminal releases as described previously.

DIAL-TO-DIAL

Figure 10:
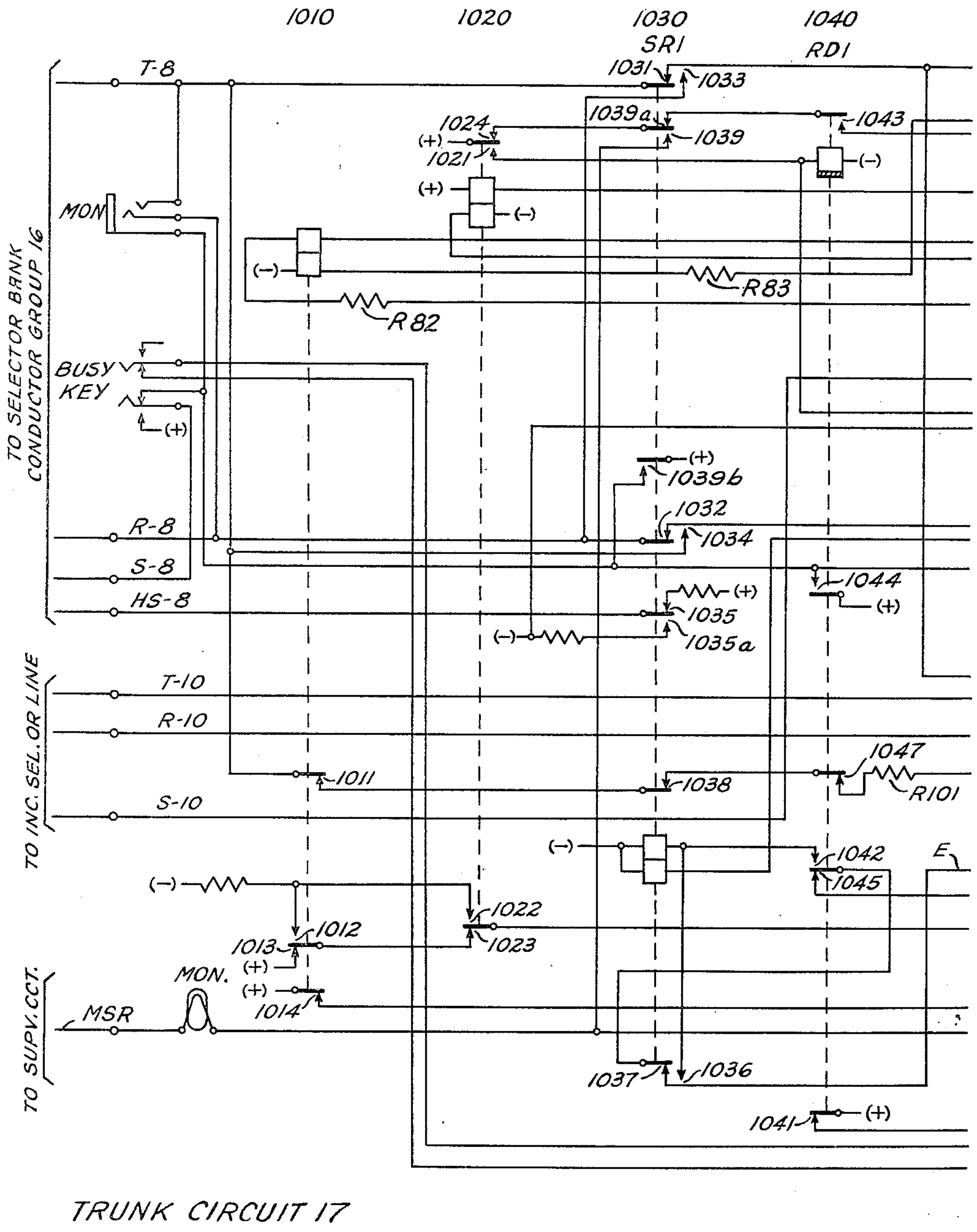
Figure 11:
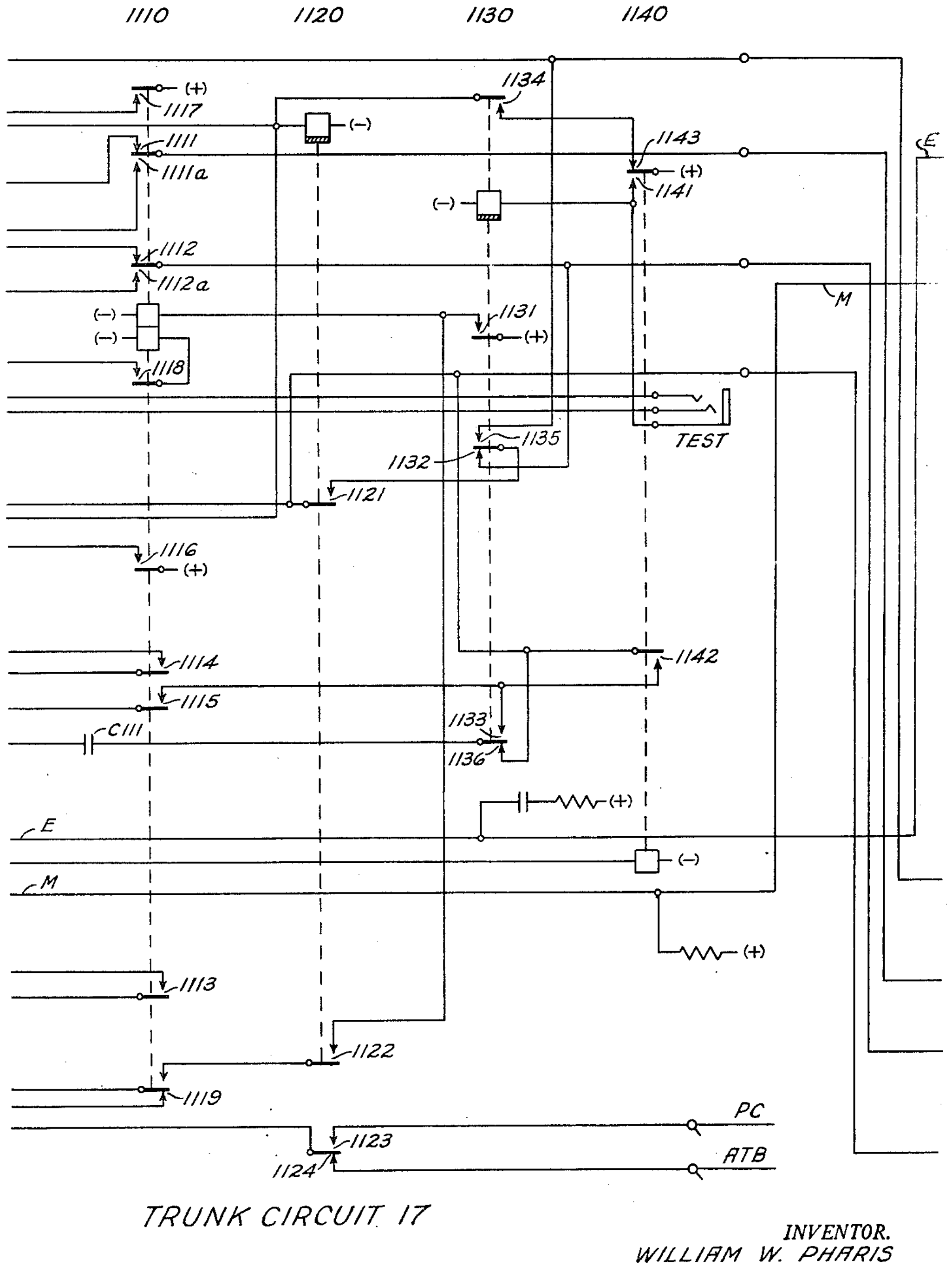

There is illustrated in Figs. 10 and 11 a carrier trunk circuit particularly adapted for dial-to-dial calls. As indicated in Fig. 1, the local selector 6 when stepped to its tenth level, seizes carrier trunk circuit 17 of Figs. 10 and 11 over conductor cable or group 16. Incoming selector 24 is also associated with carrier trunk circuit 17. In turn, when requirements are such that signaling over the dial leg is not permissible, carrier trunk circuit 17 is connected to the local carrier terminal 21 by means of a carrier adapter circuit 20 (shown in detail in Fig. 12); otherwise, the circuit of Fig. 12 may be omitted. The remote end, shown in Figs. 13, 14 and 15 may duplicate the local end disclosed in Figs. 10, 11 and 12.

The carrier trunk circuit of Figs. 10 and 11 is intended to provide a number of principal functions. On outgoing calls, the circuit is arranged to hold the preceding equipment operated and to make itself busy to other calls; to transmit dial pulses to the distant office; to give reverse battery and HS supervision; to make itself available to other calls when the last party disconnects; and to provide all trunks busy and peg count metering. On incoming calls, the circuit functions to seize the succeeding equipment; to make itself busy to other calls; to repeat impulses from the distant office; to furnish supervision to the distant office; to provide all-trunks-busy metering; and to make itself available to other calls when the last party disconnects.

*Outgoing call.*—When the local selector 6 halts in a position to extend a call from line 1 to carrier trunk circuit 17, the carrier trunk circuit shown in Figs. 10 and 11 is seized and the preceding equipment effects closure of a loop over tip and ring leads T–8 and R–8, respectively, and repeat coil RC121 (Fig. 12) over a circuit extending from tip lead T–8 by way of break contacts 1031, repeat coil winding 75, break contacts 1111 and upper winding of calling bridge relay 1020 to ground. The circuit from ring lead R–8 extends to battery by way of break contact 1032, repeat coil winding 76, break contacts 1112 and the lower winding of relay 1020.

Figure 12:
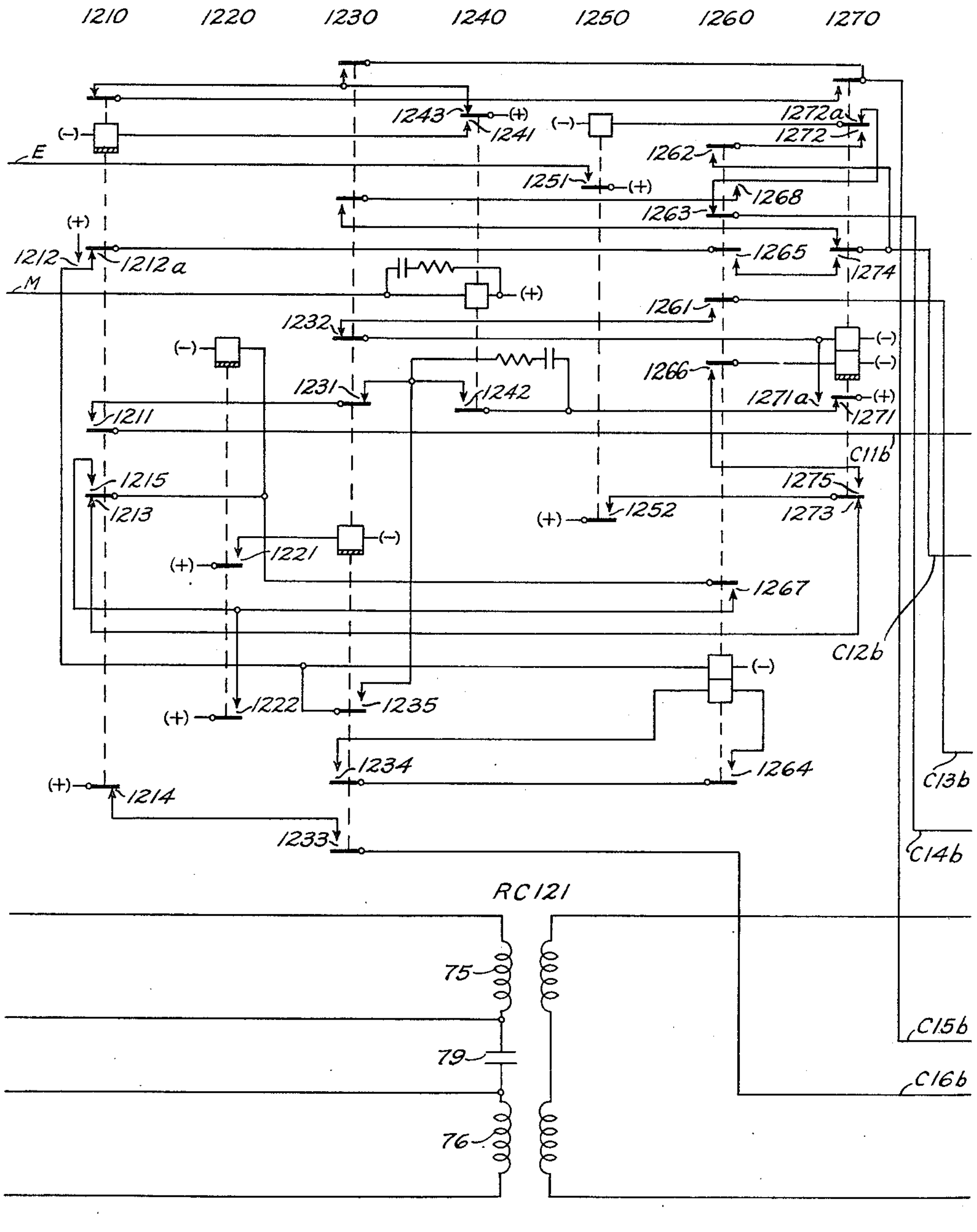
Figure 13:
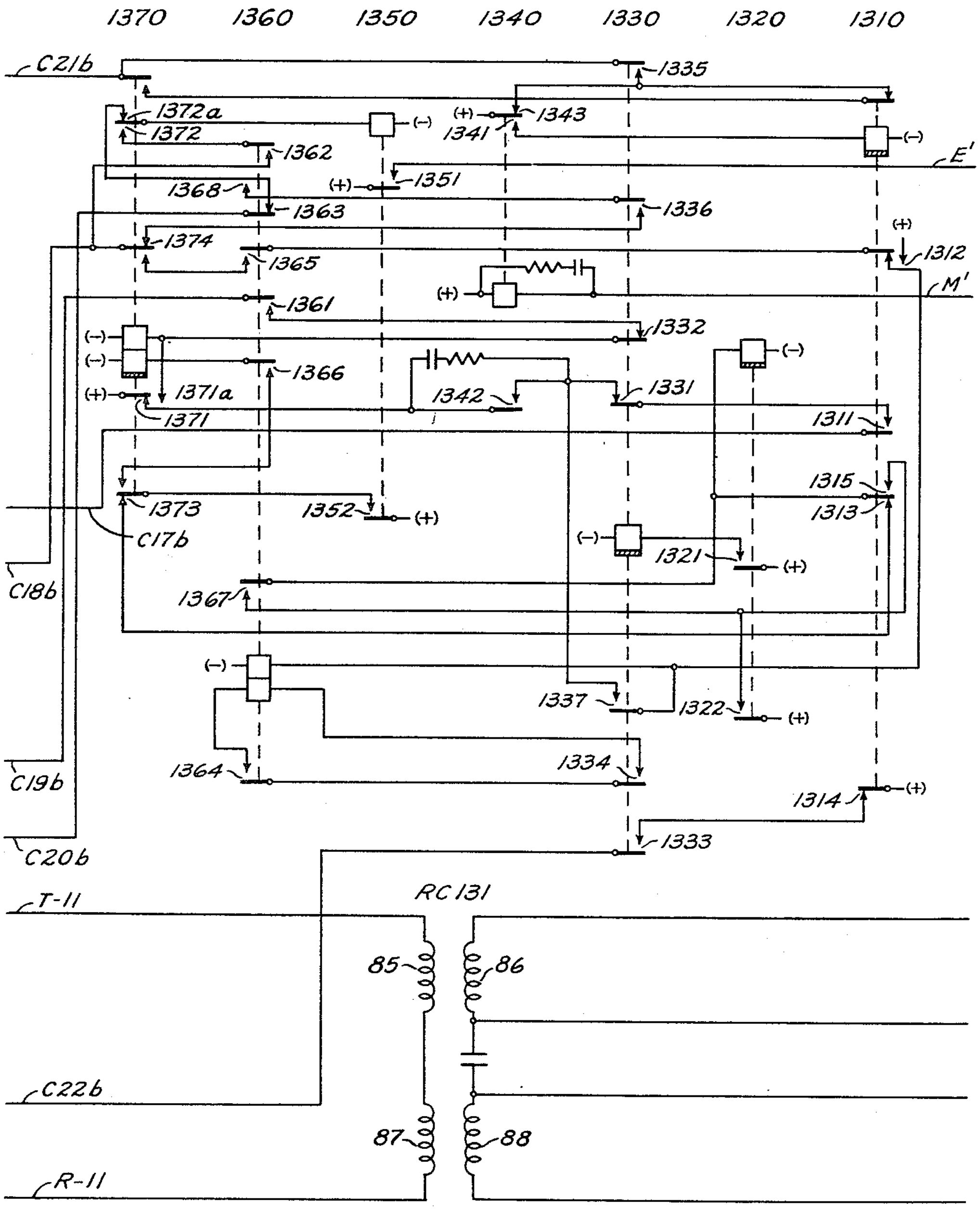
Figure 14:
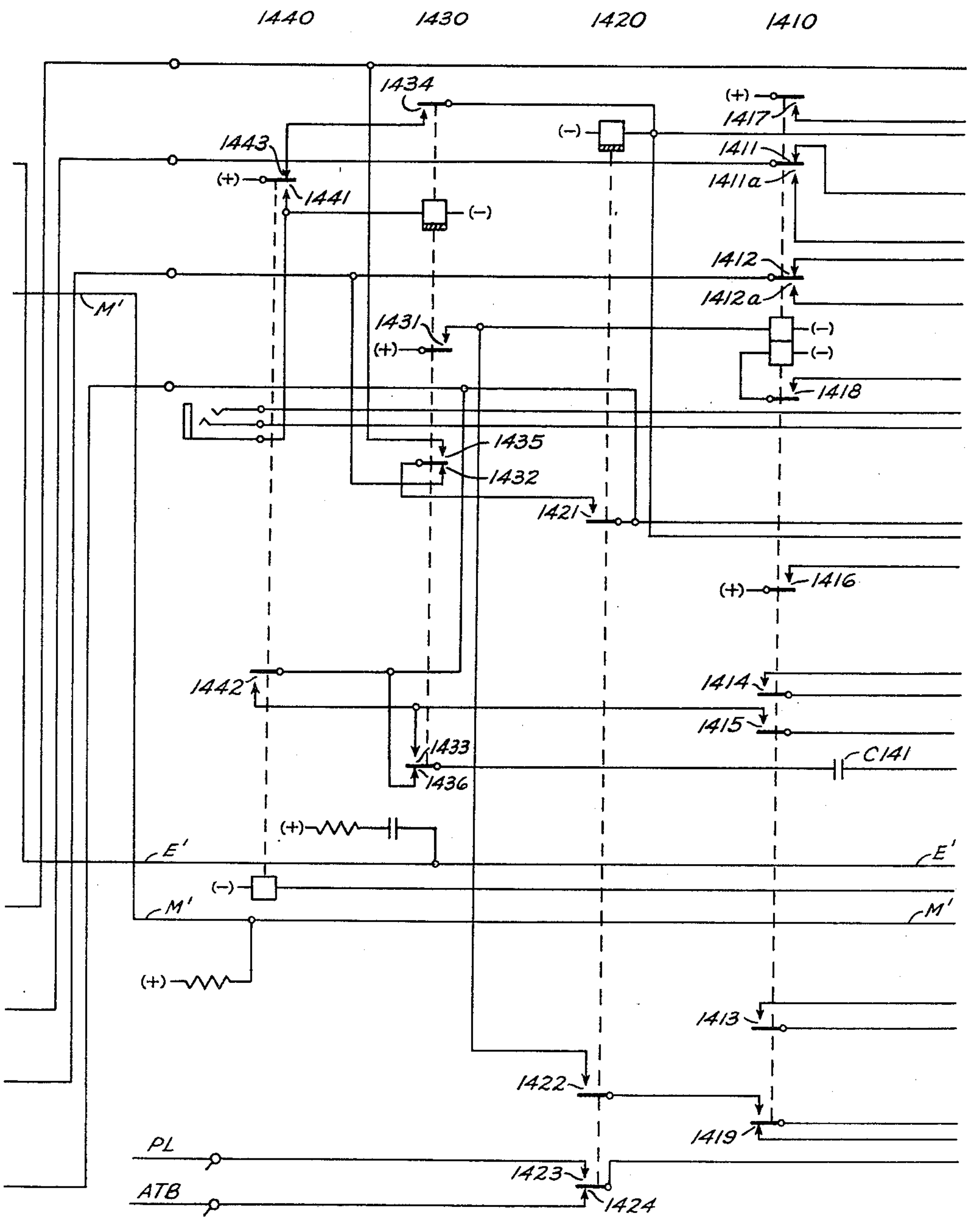
Figure 15:
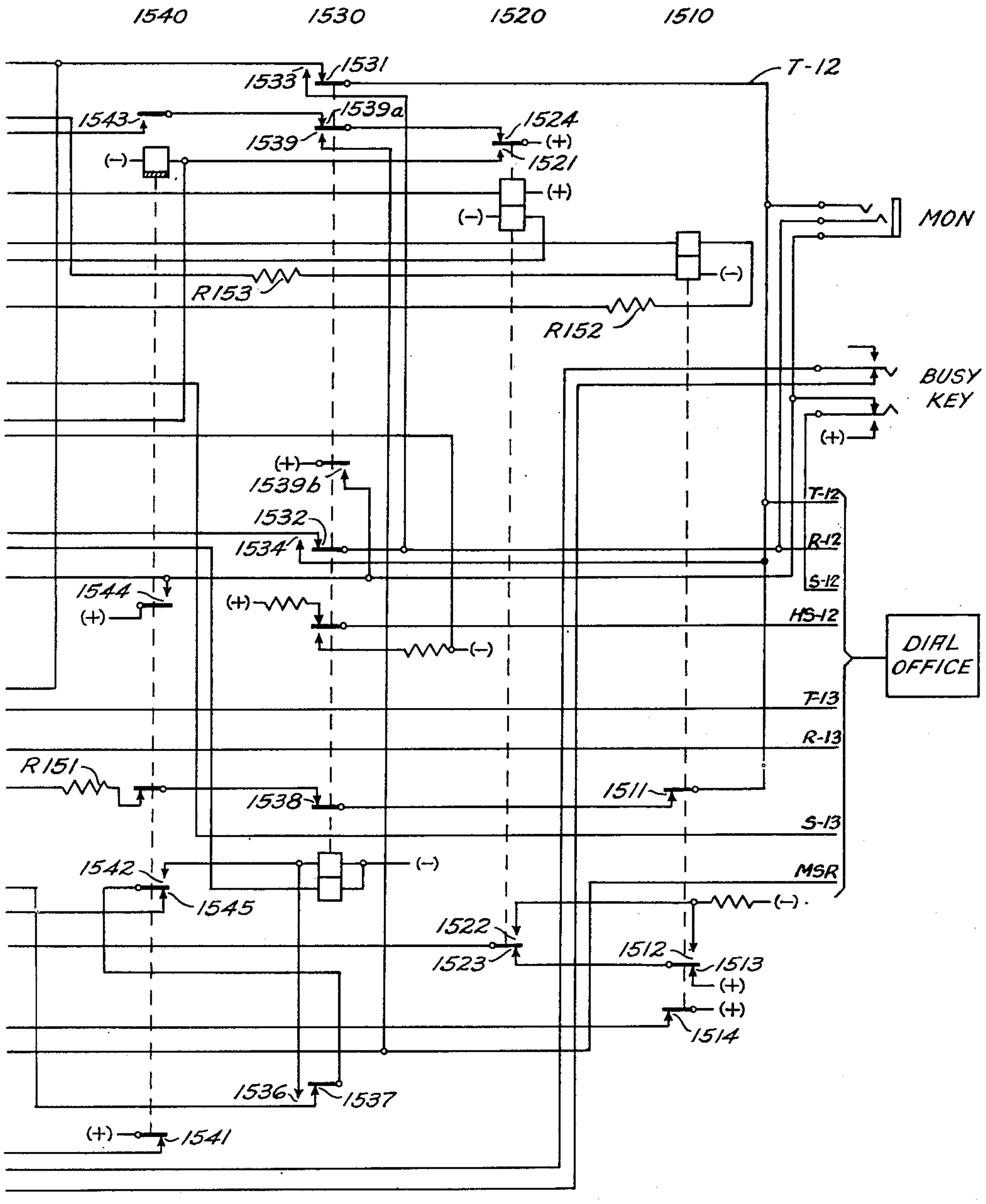

Relay 1020 operates to close a circuit for energizing relay 1040 at make contacts 1021 and transfers the M lead which extends to the signaling or adapter circuit shown in Fig. 12 from ground by way of break contacts 1013 and 1023 to resistance battery at make contacts 1022. Resistance battery on the M lead causes the energization of relay 1240 over a circuit extending over the M lead through the winding of relay 1240 to ground. Energization of relay 1240 causes the energization of relay 1210 over a circuit extending from battery through the winding of relay 1210 to ground by way of make contacts 1241. In response to the operation of relay 1210, relay 510b in the local carrier terminal 21 is energized over a circuit extending from battery on one side of the winding of relay 510b to ground at the other terminal of relay winding 510b by way of conductor C11b, make contacts 1211, break contacts 1231, make contacts 1242 and break contacts 1271; and relay 1260 is energized over a circuit including transfer contacts 1212.

Returning to Fig. 10, in response to the operation of relay 1040, the sleeve lead, S–8 is grounded to hold the preceding equipment operated over a circuit extending from the back sleeve lead S–8 through break contacts of the busy key BSY and operated contacts 1044; the all-trunks-busy lead ATB is disconnected from ground at break contacts 1041; the supervisory relay 1030 is connected to the E lead over a circuit extending from the upper winding of relay 1030 through make contacts 1042 and break contacts 1037 (relay 1030 does not operate at this time); and the idle termination comprising resistor R101 and capacitor C111 is broken at break contacts 1047.

The operation of relay 510b causes operation of relay 630b by way of the carrier connection 18 and carrier adapter circuit 29 (Fig. 13) is is seized responsive thereto.

Relay 1350 is energized over a circuit extending from the winding of relay 1350 through break contacts 1372a and 1363, and conductor C20b to ground at contacts 631b.

The operation of relay 1350 grounds lead E′ to the carrier trunk 30 at make contacts 1351, and completes a circuit for energizing relay 1320, the circuit to ground extending from the winding of relay 1320 by way of break contacts 1313 and 1373 and operated contacts 1352.

Relay 1320, upon operating, completes a circuit for energizing relay 1330 at operated contacts 1321.

In response to the operation of relay 1330, relay 640b is energized over a circuit including conductor C22b, operated contacts 1333 and break contacts 1314; a circuit is prepared to short circuit the lower winding of relay 1360 at contacts 1334; and relay 650b is operated by way of conductor C21b, make contacts 1335 and break contacts 1343.

Referring back to the grounding of lead E′ at contacts 1351, relay 1440 operates at this time over a circuit including the E′ lead, break contacts 1537 and 1545 and the winding of relay 1440. The operation of relay 1440 completes at operated contacts 1441 an obvious circuit for energizing relay 1430. In response to the operation of relay 1430, relay 1410 operates from ground at operated contacts 1431, and the idle termination comprising resistor R151 and capacitor C141 is connected to one side of pulsing contacts 1442 at contacts 1433 for pulse suppression purposes.

The operation of relay 1410 serves to ground the MSR lead at make contacts 1413; to ground sleeve lead S–12 to the outgoing selector bank at make contacts 1416; to energize the lower winding of relay 1510 by way of resistor R153 and make contacts 1417; to lock itself to sleeve ground through contacts 1418 and sleeve lead S–13; removes ground from all-trunks-busy lead ATB at break contacts 1419; and to cut through the connection to an incoming selector at dial office 15 over leads T–13 and R–13 by way of make contacts 1414, winding 86, make contacts 1411a, upper winding of relay 1510, resistor R152, make contacts 1412a, winding 83, make contacts 1442, and make contacts 1415.

Relay 1510 is differentially wound and does not operate at this time.

Referring back to the operation of relay 650b, the return supervisory signal caused by the closing of contacts 652b causes the energization of relay 520b.

In response to the operation of relay 520b, relay 1270 is energized over a circuit from battery through the upper winding of relay 1270 through break contacts 1232, make contacts 1261, conductor C13b, and make contacts 52b to ground, thereby transferring ground for relay 510b from ground at break contacts 1271 to ground through transfer contacts 1271a, break contacts 1232, make contacts 1261, conductor C13b and make contacts 521b.

Dialing may now take place.

Relay 1020 follows the outgoing dial pulses and alternately places resistance battery and ground on the M lead in order to repeat or transmit the impulses into carrier adapter circuit 20. Upon restoring on the first impulse, relay 1020 opens the energization circuit for relay 1040 at make contacts 1021 and closes a circuit to energize shunt relay 1120, the circuit extending to ground through the winding of relay 1120, still operated contacts 1043, break contacts 1039a and now closed contacts 1024 (relay 1040 is slow-to-release and hence remains operated during dial pulses representing each digit).

Upon the operation of shunt relay 1120, the repeat coil winding 76 is shortcircuited to minimize impulse distortion by reducing the inductance of the repeat coil RC121 over a circuit extending from the upper terminal of winding 76, through break contacts 1132 and make contacts 1121 to the lower terminal of coil 76. The shunt relay 1120 also remains operated during impulsing because it is made to have a slow-to-release characteristic.

At the end of each series of impulses, i. e., at the end of each digit, calling bridge relay 1020 reoperates and in so doing, recloses the circuit to relay 1040 at make contacts 1021 and opens the energization circuit for shunt relay 1120 at break contacts 1020. Upon the release or restoration of relay 1120, the shortcircuit across repeat coil winding 76 is removed.

For the remaining series of impulses, or additional dialed digits, the circuit functions as described above.

Referring now to Fig. 12, dial pulses cause pulsing of relay 1240 because of the pulsing of lead M, and relay 510b follows the pulsing of relay 1240 because of the pulsing of contacts 1242. Relay 510b in turn effects pulsing of relay 630b and, consequently, contacts 631b, at the distant terminal.

Relay 1350 pulses lead E′ responsive to the pulsing of contacts 631b whereby relay 1440 pulses the incoming loop including leads T–13 and R–13 to control the succeeding switching apparatus. During the first release of relay 1440, relay 1420 is energized through still operated contacts 1434 and break contacts 1443. During pulsing of relay 1440, relays 1430 and 1420 are periodically deenergized but having slow-to-release chaarcteristics, remain operated during pulsing. At the end of the last dialed digit, relay 1420 is released at contacts 1443 and relay 1430 is re-energized at contacts 1441.

When the called party answers, means (not shown) in the succeeding equipment is rendered effective in the conventional manner for reversing battery over the tip and ring leads T-13 and R-13, respectively. Relay 1510 operates on reversed battery, the circuit extending from tip lead T-13 through operated contacts 1414, winding 86 of repeat coil RC131, operated contacts 1411*a*, upper winding of relay 1510, operated contacts 1412*a*, winding 88 of repeat coil RC131, and operated contacts 1442 and 1415 to ring lead R-13 and the loop thereacross.

The operation of relay 1510 reconnects the idle line termination comprising resistance R151 and capacitance C141 at break contacts 1511; removes ground from the MSR lead at break contacts 1514; and transfers the M' lead from ground at break contacts 1513 to resistance battery at make contacts 1512 to provide answer supervision.

The appearance of resistance battery on the M' lead causes operation of relay 1340 over the M' lead.

In response to the operation of relay 1340 a circuit is completed at contacts 1341 for operating relay 1310 over an obvious circuit; a circuit is also completed for operating relay 1360 over a circuit extending from the winding of relay 1360 through operated contacts 1337 and 1342 and break contacts 1371 to ground.

The operation of relay 1360 also completes a holding path for relay 1350 over a circuit extending from battery through the winding of relay 1350, break contacts 1372*a*, transfer contacts 1368, operated contacts 1336, break contacts 1374, conductor C18*b*, and break contacts 622*b*; and completes a holding circuit for relay 1320 through operated contacts 1367 and 1322.

The operation of relay 1310 completes an alternate circuit for relay 1360 at transfer contacts 1312; releases relay 640*b* at contacts 1314; releases relay 650*b* at break contacts 1314; and completes an alternate holding path for relay 3120 by way of operated contacts 1315 and 1322.

In response to the release of relay 650*b*, the supervisory signal over carrier medium 18 is removed and relay 520*b* is de-energized. Upon the release of relay 520*b* and the consequent opening of contacts 521*b*, slow-to-release relay 1270 is de-energized but before it releases, a new energizing circuit is completed, as described below. Upon the closure of contacts 522*b*, relay 1250 is operated over a circuit including the winding of relay 1250, make contacts 1272, make contacts 1262, conductor C12*b* and break contacts 522*b* to ground. Responsive to the operation of relay 1250, ground is placed on lead E at make contacts 1251, thereby energizing relay 1030, the circuit extending from ground on lead E at make contacts 1251 through break contacts 1037 and operated contacts 1042 and the upper winding of relay 1030 to battery; and the above-mentioned new energization path for relay 1270 is established by way of its lower winding and operated contacts 1266, 1275 and 1252.

When relay 1030 operates, the connections to the tip and ring leads T-8 and R-8 to the preceding equipment are reversed at make contacts 1033 and 1034. Lead HS-8, heretofore connected to resistance ground through break contacts 1035, is now connected to resistance battery through make contacts 1035*a*; the sleeve lead S-8 is grounded at make contacts 1039*b*; a holding circuit for relay 1030 is established through transfer contacts 1036 to lead E.

The conversation circuit is now established.

The sequence of operations following calling party disconnect is next described. When the calling party disconnects, the circuit for calling bridge relay 1020 is interrupted in a conventional manner. Relay 1020 thereupon restores to open the energization circuit for relay 1040 at make contacts 1021; to ground the MSR lead through make contacts 1039 and break contacts 1024; and to transfer the M lead from resistance battery to ground through break contacts 1023 and 1013 to thereby de-energize relay 1240. The release of relay 1040 reconnects the idle line termination at contacts 1047. The release of relay 1240 opens the energization circuit for relay 1210. After a time delay, relay 1210 releases and transfers the holding circuit for relay 1260 to ground by way of break contacts 1212*a* operated contacts 1265 and 1274 and break contacts 522*b*.

When the called party thereafter disconnects, the loop over conductors T-13 and R-13 is opened, causing relay 1510 to release and apply ground to the M' lead through break contacts 1513 as well as reconnecting the idle line termination at contacts 1511. Ground now appears at both terminals of the winding of relay 1340 and that relay releases whereupon relay 1310, its energization circuit now open at contacts 1341, releases. Relay 1320 holds up by way of operated contacts 1367 which shunt contacts 1315.

In response to the release of relay 1310, relay 1360 releases at transfer contacts 1312, the alternate path having been previously opened at contacts 1342; and relay 650*b* is re-energized over conductor C21*b*, operated contacts 1335 and break contacts 1343 to cause the transmission of a supervisory control signal from remote carrier terminal 21' to local carrier terminal 21 in order to reoperate relay 520*b*.

The release of relay 1360 de-energizes relay 1320 at now-open contacts 1367 and releases relay 1350 at break contacts 1368.

The release of relay 1350 removes ground from the E' lead to trunk circuit 30 at contacts 1351, thereby releasing relay 1440. Relay 1430 is de-energized by the opening of contacts 1441, and releases after a time delay to release relay 1410 at contacts 1431.

Referring back to relay 1320, this relay, after a time delay, releases to de-energize relay 1330. After a time delay, relay 1330 releases, and releases relay 650*b* at contacts 1335. In response to the disappearance of supervisory voltage caused by the release of relay 650*b*, relay 520*b* releases.

Referring back to the operation of relay 520*b* (4th paragraph supra), ground is removed from conductor C12*b*, thereby releasing relays 1250 and 1260. As a result of the release of relay 1250, ground is removed from the E lead at contacts 1251 and relay 1270 is de-energized at contacts 1252. Upon the removal of ground from the E lead, relay 1030 is de-energized.

Upon the restoration of relay 1030, ground is removed from the MSR lead at make contacts 1039; battery is reversed at contacts 1031 and 1032; lead HS-8 is transferred to resistance ground at contacts 1035; busy ground is removed from sleeve lead S-8 at contacts 1039*b* to allow the preceding equipment to restore; the circuit for energizing shunt relay 1120 is reclosed at break contacts 1039a; and the idle termination is restored at contacts 1038.

Shunt relay 1120 reoperates during the release time of slow-to-release relay 1040 and prepares a circuit for peg count metering at make contacts 1123.

Relay 1120 is slow to release and upon restoring opens the circuit to the peg count lead PC at make contacts 1123; and grounds the all-trunks-busy lead ATB at break contacts 1124 over a circuit extending from the ATB lead by way of break contacts 1124, normally closed contacts of the busy key BSY, break contacts 1119 and break contacts 1041.

The sequence of operations which follows when the called party disconnects first is as follows. The loop over T-13 and R-13 is opened causing relay 1510 to release and ground the M' lead through break contacts 1513. As a result, relay 1340 is released. In response to the opening of contacts 1341, relay 1310 releases and thereupon relay 1360 releases at transfer contacts 1312.

Also, in response to the release of relay 1310, relay 650b is energized over conductor C21b, operated contacts 1335, and break contacts 1343. As previously explained, relay 520b next operates.

Relay 1320 is de-energized at contacts 1367 when relay 1360 releases (shunt contacts 1315 having opened when relay 1310 released) and relay 1350 is released at now open transfer contacts 1363. The release of relay 1350 effects the release of relay 1440 by removing ground from lead E' at contacts 1351. Relay 1430 is de-energized at contacts 1441 and after a delayed release, releases relay 1410 at contacts 1431.

Referring now to the operation of relay 520b in the carrier terminal 21, relays 1250 and 1260 are released by the opening of contacts 522b.

The circuit over which relay 1030 is energized is broken by the removal of ground on lead E at contacts 1251. Relay 1030 restores to reverse battery; to remove busy ground from sleeve lead S-8; to transfer lead HS-8 to resistance ground; to ground the MSR lead as previously described; and to prepare at contacts 1039a a circuit for the reoperation of relay 1120.

When the calling party disconnects, the loop circuit, including relay 1020, is opened and that relay restores to open the circuit for relay 1040; recloses the circuit for relay 1120 at break contacts 1024; and transfers the M lead to ground at break contacts 1023, thereby shunting out, and hence releasing relay 1240. Relay 1210 releases at contacts 1241.

Relay 1120 reoperates and prepares a circuit for peg count metering at contacts 1123.

Upon the restoration of relay 1040 after a time delay, the energizing circuit for relay 1120 is opened at contacts 1043; and the circuit from the peg count lead is closed at contacts 1041 as previously described. Upon the release of relay 1120, after a time delay, the circuit to the peg count lead PC is reopened at contacts 1123 and the ATB lead is grounded through contacts 1124, busy key BSY, contacts 1119, and contacts 1041.

*Incoming call.*—Inasmuch as duplicate circuits are shown for both carrier trunk circuits 17 and 30, incoming calls for trunk 30 have already been detailed. Hence, an incoming call to trunk circuit 17 is described only briefly. The adapter circuit of Fig. 12 is seized upon the receipt of supervisory signals from the calling end and the consequent operation of relay 530b. Relay 1250 is then operated over a circuit extending from the winding of relay 1250, through break contacts 1272a and 1263, conductor C14b and make contacts 531b to ground. Lead E to the carrier trunk circuit 17 is grounded at make contacts 1251.

The operation of relay 1250 also effects the energization of relay 1220 over a circuit extending from the winding of relay 1220 through break contacts 1213 and 1273, and make contacts 1252 to ground.

Relay 1220, upon operating, completes a circuit for energizing the winding of relay 1230 at make contacts 1221.

Relay 1230, upon operating, causes the operation of relay 540b over a circuit extending from the winding of relay 540b by way of conductor C16b and make contacts 1233 to ground at break contacts 1214. The operation of relay 1230 is also utilized to short circuit the lower winding of relay 1260 through operated contacts 1234 and 1264 to render that relay slow-to-release.

Relay 530b follows the incoming dial pulses and, in turn, pulses relay 1250 and relay 1250 pulses lead E.

The carrier trunk 17, illustrated in Figs. 10 and 11, is seized on an incoming call by the appearance of ground on the E lead, in response to the energization of pulsing relay 1250 in the carrier adapter circuit 20 shown in detail in Fig. 12. Ground pulses on lead E cause the pulsing of pulsing relay 1140 through break contacts 1037 and 1045. The pulsing relay 1140 operates, when energized, to complete a circuit for energizing relay 1130 at make contacts 1141.

Relay 1130 operates and closes a circuit to energize relay 1110 through make contacts 1131, and prepares a spark suppression circuit for contacts 1142 including the idle line termination over a circuit extending from the lower terminal of repeat coil 76, make contacts 1142, make contacts 1133, capacitor C111, resistor R101, and break contacs 1038, 1011 and 1031 to the upper terminal of repeat coil winding 75.

The operation of relay 1110 serves to ground the MSR lead at make contacts 1113; to close the loop to the succeeding equipment over the primary or upper winding of relay 1010, the circuit extending from tip lead T-10 to ring lead R-10 by way of make contacts 1114, winding 75, make contacts 1111a, upper winding of relay 1010, resist R82, make contacts 1112a, repeat coil winding 76, make contacts 1142 and make contacts 1115; to ground the back sleeve lead S-8 to the outgoing selector bank at make contacts 1116; to energize the lower or secondary winding of relay 1010 over a circuit extending from battery through the lower winding of relay 1010, resistor R83 and make contacts 1117 to ground; to lock itself to sleeve ground being returned by the succeeding equipment over a circuit including contacts 1118 and incoming sleeve lead S-10; and removes ground from the all-trunks-busy lead ATB at break contacts 1119. Relay 1010 does not operate at this time because it is differentially energized.

The circuit is now prepared for impulsing. Pulsing relay 1140 follows the dial pulses incoming over lead E and thereby alternately opens and closes the loop to the succeeding equipment. On the first impulse of each series, relay 1120 is energized over a circuit extending from the winding of relay 1120 through make contacts 1134 and break contacts 1143 to ground. At the same time, the circuit for energizing relay 1130 is broken at make contacts 1141 but both relays 1120 and 1130, being slow-to-relase, remain operated during the impulsing of the digit dialed.

Upon the operation of relay 1120, the secondary side of repeat coil RC121 is shortcircuited to prevent pulse distortion over a circuit extending from the upper terminal of winding 75 through make contacts 1135 and make contacts 1121 to the lower terminal of winding 76. Also, the closure of contacts 1121 completes a spark suppression circuit for pulsing contacts 1142, the circuit including contacts 1133, capacitor C111, resistor R101, break contacts 1038, 1011, and 1031, operated contacts 1135 and 1121 back to the armature of contacts 1142. At the end of each series of impulses, relay 1120 restores to remove the shunt from the repeat coil and to open the alternate circuit to relay 1110 at make contacts 1122.

When the called party answers, a succeeding switch may be employed to reverse battery over tip and ring leads T-10 and R-10 in any conventional manner. Battery is also reversed across the primary or upper winding of relay 1010, allowing relay 1010 to operate.

The operation of relay 1010 serves to remove the idle line termination at break contacts 1011; removes ground from the MSR lead at break contacts 1014; and transfers the M lead to resistance battery at make contacts 1012 to operate relay 1240. Relay 1240 effects the release of relay 550b by opening contacts 1243 and the operation of relay 1210 at contacts 1241. Operation of relay 1210 de-energizes relay 540b at break contacts 1214, and energizes relay 1260 at transfer contacts 1212. Conversation may now take place.

When the calling party disconnects, relay 1140 is de-energized at contacts 1251 by the release of pulsing relay 1250. Relay 1140 restores and opens the loop to the succeeding equipment at make contacts 1142; opens the circuit to relay 1130 at make contacts 1141; and recloses the circuit to shunt relay 1120 at break contacts 1143. At this point, make contacts 1134 of relay 1130 are still closed because of the slow-to-release characteristic of that relay. Relay 1130, upon restoration, opens the circuit to relay 1120 at make contacts 1134, and also opens the starting or energization circuit for relay 1110 at make contacts 1131.

The succeeding equipment thereupon restores and de-energizes relay 1110 by removal of ground on lead S-10. The circuit for the upper winding of relay 1010 is also opened by reason of the opening of the loop.

Relay 1110 restores and opens the circuit to the secondary or upper winding of relay 1010 at make contacts 1112*a*; removes ground from the sleeve lead S-8 at make contacts 1116; and grounds the all-trunks-busy lead at break contacts 1119.

Relay 1010 restores to transfer the M lead to ground at break contacts 1013. Ground on the M lead de-energizes relay 1240 which de-energizes relay 1210 upon the opening of contacts 1241. The de-energization of relay 1210 also opens the holding circuit for relay 1220 at contacts 1215. Relays 1230 and 1260 release in order in response to the release of relay 1220.

When the called party disconnects first, the circuit for calling bridge relay 1020 is interrupted and restores to transfer the M lead from resistance battery to ground to release relay 1240. Release of relay 1240 opens the energization circuit for relay 1210 which releases after a time delay. When the calling party disconnects, the calling loop is opened, relay 1510 releases and lead M' is grounded whereupon relay 1340 is released. The release of relay 1340 effects the release of relays 1310 and 1360 in turn. In response to the release of relay 1360, relay 650b is reoperated by the release of relay 1360 to effect the reoperation of relay 520b, and relays 1320 and 1350 are released. Release of relay 1350 removes ground from lead E' whereupon relay 1440 releases and causes the release, in turn, of relays 1430 and 1410. Referring again to relay 1320, its release effects the release of relays 1330 and 650b in that order. Relay 520b releases next to remove ground from conductor C12b, thereby releasing relays 1250 and 1260. The restoration of relay 1250 removes ground from lead E and de-energizes relay 1270. Loss of ground on lead E de-energizes relay 1030 to reoperate relay 1120 and de-energize relay 1040. When relay 1040 restores, the preceding equipment is released by removal of ground from the sleeve lead and relay 1120 is de-energized.

While I have shown and described a particular embodiment of my invention, it will be obvious to those skilled in the art that changes and modifications may be made without departing from my invention in its broader aspects. I, therefore, aim in the appended claims to cover all such changes and modifications as fall within the true spirit and scope of my invention.

What I claim is:

1. In a carrier telephone system, a first carrier terminal, a second carrier terminal, a carrier medium connecting said terminals, a first trunk circuit connected to said first terminal, a second trunk circuit connected to said second terminal, a manual office, a calling line terminating in said manual office, dial responsive automatic switching means, an operator's position at said manual office, means for connecting said operator's position and said calling line to said first trunk, a signal device at said operator's position, means responsive to the connection of said first trunk for causing said first carrier terminal to transmit a first supervisory signal to said second carrier terminal, said second terminal including an amplifier for amplifying signals transmitted from said calling line to said second trunk circuit, said second trunk circuit including a repeat coil having a primary side and a secondary side, the primary side of said repeat coil being connected to the output of said amplifier, a capacitor and a resistor connected in series across said secondary side of said repeat coil for balancing the calling line and preventing singing thereover, means responsive to the receipt of said first supervisory signal by said second carrier terminal for seizing said second trunk circuit, said second trunk circuit including a relay, said relay having a pair of contacts, means responsive to seizure of said second trunk circuit for disconnecting said capacitor and resistor from across said secondary side of said repeat coil and for connecting said capacitor and resistor in series with said contacts for spark suppression purposes and for extending said second trunk circuit to said switching means, the last-mentioned means comprising a dial at said operator's position, means for causing said relay to operate in accordance with the receipt of dial pulses from said dial for pulsing said contacts, means including said pulsing contacts for directing movement of said switching means, means responsive to said extension for causing said second carrier terminal to transmit a second supervisory signal to said first carrier terminal, and means responsive to the receipt of said second signal by said first carrier terminal for operating said signal device, the operation of said signal device constituting a start-dialing signal, dial means, and means utilizing said dial means for transmitting dial impulses to said second trunk.

2. In an automatic telephone system, a calling line, a called line, a trunk circuit, means for extending a call from said calling line to said trunk circuit, said means including a vacuum tube amplifier having an input circuit and an output circuit, means for connecting said calling line to said input circuit, said trunk circuit including a repeat coil having a primary and a secondary, means for connecting said primary to said output circuit, an idle line termination shunting said secondary to balance said calling line and to prevent singing thereover prior to the answering of a call at said called line; switching means for connecting said secondary to said called line, a source of impulses at said calling line for causing said switching means to connect said secondary to said called line, a pulsing relay in said trunk circuit, said relay having a pair of contacts, means for pulsing said relay according to the number of impulses transmitted, a circuit for operating said switching means including said contacts, and means responsive to the seizure of said trunk circuit for connecting said idle line termination in a series circuit with said contacts for suppressing sparking at said contacts during impulsing periods.

3. In an automatic telephone system, a calling line, a called line, a trunk circuit, means for extending a call from said calling line to said trunk circuit, said means including a vacuum tube amplifier having an input circuit and an output circuit, means for connecting said calling line to said input circuit, said trunk circuit including a repeat coil having a primary and a secondary, means for connecting said primary to said output circuit, an idle line termination shunting said secondary to balance said calling line and to prevent singing thereover prior to the answering of a call at said called line; switching means for connecting said secondary to said called line, a source of impulses at said calling line for causing said switching means to connect said secondary to said called line, a pulsing relay in said trunk circuit, said relay having a pair of contacts, means for pulsing said relay according to the number of impulses transmitted, a circuit for operating said switching means including said contacts, and means responsive to the seizure of said trunk circuit for connecting said idle line termination and said pulsing contacts in a spark suppression circuit.

4. In an automatic telephone system, a calling line, a called line, a trunk circuit, means for extending a call from said calling line to said trunk circuit, said means including a vacuum tube amplifier having an input circuit and an output circuit, means for connecting said calling line to said input circuit, said trunk circuit including a repeat coil having a primary and a secondary, means for connecting said primary to said output circuit, an idle line termination shunting said secondary to balance said calling line and to prevent singing thereover prior to the answering of a call at said called line; switching means for connecting said secondary to said called line, a source of impulses at said calling line for causing said switching means to connect said secondary to said called line, a pulsing relay in said trunk circuit, said relay having a pair of contacts, means for pulsing said relay according to the number of impulses transmited, a circuit for operating said switching means including said contacts, and means responsive to the seizure of said trunk circuit for connecting said idle line termination and said pulsing contacts in a spark suppression circuit, said idle line termination comprising a capacitor and a resistor.

5. In an automatic telephone system, a calling line, a called line, a trunk circuit, means for extending a call from said calling line to said trunk circuit, said means including a vacuum tube amplifier having an input circuit and an output circuit, means for connecting said calling line to said input circuit, said trunk circuit including a repeat coil having a primary and a secondary, means for connecting said primary to said output circuit, an idle line termination shunting said secondary to balance said calling line and to prevent singing thereover prior to the answering of a call at said called line; switching means for connecting said secondary to said called line, a source of impulses at said calling line for causing said switching means to connect said secondary to said called line, a pulsing relay in said trunk circuit, said relay having a pair of contacts, means for pulsing said relay according to the number of impulses transmitted, a circuit for operating said switching means including said contacts, means responsive to the seizure of said trunk circuit for connecting said idle line termination in a series circuit with said contacts for suppressing sparking at said contacts during impulsing periods, and means responsive to the answering of said call at said line for opening said series circuit.

6. In an automatic telephone system, a calling line, a called line, a trunk circuit, means for extending a call from said calling line to said trunk circuit, said means including a vacuum tube amplifier having an input circuit and an output circuit, means for connecting said calling line to said input circuit, said trunk circuit including a repeat coil having a primary and a secondary, means for connecting said primary to said output circuit, an idle line termination shunting said secondary to balance said calling line and to prevent singing thereover prior to the answering of a call at said called line; switching means for connecting said secondary to said called line, a source of impulses at said calling line for causing said switching means to connect said secondary to said called line, a pulsing relay in said trunk circuit, said relay having a pair of pulsing contacts, a second relay in said trunk circuit, said second relay having a pair of normally closed contacts, means for pulsing said pulsing relay according to the number of impulses transmitted, a circuit for operating said switching means including said pulsing contacts, means responsive to the seizure of said trunk circuit for connecting said idle line termination in a series circuit including said pulsing contacts and said normally closed contacts for suppressing sparking at said contacts during impulsing periods, and means responsive to the answering of said call at said called line for operating said second relay to open said normally closed contacts whereby said spark suppression circuit is disconnected.

7. In a carrier telephone system having a first exchange, a first trunk circuit, means for connecting said first exchange to said first trunk circuit; a first carrier terminal, a first adapter circuit connecting said first trunk circuit to said first carrier terminal, a first control conductor extending between said first trunk circuit and said first adapter circuit, a second carrier terminal, a carrier medium connecting said terminals and having a normal carrier frequency and first and second shifted supervision signal carrier frequencies, a second trunk circuit, a second adapter circuit connecting said second terminal to said second trunk circuit, a second control conductor extending between said second adapter circuit and said second trunk circuit, a second exchange, and means for connecting said second trunk circuit to said second exchange; a calling station adapted to be connected to said first exchange; means for seizing said first trunk circuit responsive to a calling condition in said first exchange from said calling station; a first relay, said first relay being located in said first adapter circuit, means responsive to seizure of said first trunk circuit for operating said first relay over said first control conductor; means responsive to the operation of said first relay for seizing said first carrier terminal; means responsive to seizure of said first carrier terminal to shift to the first supervisory signal carrier frequency for transmitting a supervisory signal to said second carrier terminal; means responsive to the receipt of said supervisory signal at said second terminal for seizing said second adapter circuit; a second relay, said second relay being located in said second trunk circuit; means responsive to the seizure of said second adapter circuit for operating said second relay over said second control conductor for completing a called loop to said second exchange, dialing means at said calling station; means responsive to the receipt of dial pulses from said calling station for pulsing said first control conductor to consecutively pulse said first relay, said second relay and said called loop, a called station connected to said called loop through said second exchange, a third control lead, said third control lead being connected between said second trunk circuit and said second adapter circuit, a third relay, said third relay being located in said second adapter circuit, means responsive to the answering of the call extended to said called station for operating said third relay, and means responsive to the operation of said third relay to restore the normal carrier frequency for releasing said supervisory signal means, means responsive to hang-up at the first exchange for releasing said first relay over said first control conductor, means responsive to hang-up at the second exchange for releasing said third relay over said third control conductor, means responsive to the release of said third relay for causing said second terminal to shift the carrier to the second supervisory carrier frequency to transmit a third control signal and to release said second relay over said second control conductor to release said second trunk circuit, a fourth control conductor extending between said first trunk circuit and said first adapter circuit, and means responsive to the receipt of said third supervisory control signal at said first terminal and utilizing said fourth control conductor for releasing said first trunk circuit.

References Cited in the file of this patent

UNITED STATES PATENTS

| Number | Name | Date |
|---|---|---|
| Re. 22,441 | King et al. | Feb. 22, 1944 |
| 2,155,176 | Wicks | Apr. 18, 1939 |
| 2,179,826 | May | Nov. 14, 1939 |
| 2,193,973 | Lomax | Mar. 19, 1940 |
| 2,345,048 | Hubbard et al. | Mar. 28, 1944 |
| 2,523,914 | Molnar | Sept. 26, 1950 |
| 2,590,672 | Bakker | Mar. 25, 1952 |
| 2,603,717 | Molnar | July 15, 1952 |